(12) United States Patent
Bishop

(10) Patent No.: US 10,423,696 B2
(45) Date of Patent: *Sep. 24, 2019

(54) INTELLIGENT MESSAGE PROCESSING

(71) Applicant: AT&T Intellectual Property I, L.P., Atlanta, GA (US)

(72) Inventor: Michael L. Bishop, Atlanta, GA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 282 days.

This patent is subject to a terminal disclaimer.

(21) Appl. No.: 14/970,490

(22) Filed: Dec. 15, 2015

(65) Prior Publication Data

US 2016/0103792 A1   Apr. 14, 2016

Related U.S. Application Data

(63) Continuation of application No. 12/964,267, filed on Dec. 9, 2010, now Pat. No. 9,251,508.

(51) Int. Cl.
*G06F 17/21* (2006.01)
*G06F 16/16* (2019.01)
(Continued)

(52) U.S. Cl.
CPC .......... *G06F 17/211* (2013.01); *G06F 3/0486* (2013.01); *G06F 3/04812* (2013.01);
(Continued)

(58) Field of Classification Search
CPC .. G06F 17/211; G06F 3/04812; G06F 3/0486; G06F 17/30126; G06F 17/30165; G06Q 10/107; H04L 51/14; H04L 51/22
See application file for complete search history.

(56) References Cited

U.S. PATENT DOCUMENTS 4,774,377 A * 9/1988 Barger .............. C07C 2/70
585/323
4,857,666 A * 8/1989 Barger .............. C07C 2/70
585/323
(Continued)

OTHER PUBLICATIONS

Evolution 2.28 (http://projects.gnome.org/evolution/doc/evolution228.pdf; dated Jul. 2007, last accessed Nov. 16, 2012) (hereinafter Evolution228).*

(Continued)

*Primary Examiner* — Jung-Mu T Chuang
(74) *Attorney, Agent, or Firm* — Amin, Turocy & Watson, LLP

(57) ABSTRACT

Techniques facilitate intelligent message processing of messages. With regard to a message, an intelligent message processor component (IMPC) can intelligently identify a desired file folder and archive the message in the folder in response to as little as one user interface (UI) control manipulation (e.g., click), when the intelligent message processor UI (IMPUI) is activated. When the IMPUI is activated, the IMPC automatically parses the message and identifies, or allows the user to identify, a keyword/phrase in the message. The IMPC automatically identifies the desired folder based on the identified keyword/phrase, and the user can click on the identified keyword/phrase to store the message in the identified file folder. The IMPUI also can comprise other UI controls that can, e.g., forward a message to another user, archive the message or related attachment in a remote storage destination, perform a customized message process, etc.

20 Claims, 16 Drawing Sheets

US 10,423,696 B2
Page 2

(51) Int. Cl.
*G06F 16/176* (2019.01)
*G06Q 10/10* (2012.01)
*G06F 3/0481* (2013.01)
*G06F 3/0486* (2013.01)
*H04L 12/58* (2006.01)

(52) U.S. Cl.
CPC .......... *G06F 16/168* (2019.01); *G06F 16/176* (2019.01); *G06Q 10/107* (2013.01); *H04L 51/14* (2013.01); *H04L 51/22* (2013.01)

(56) References Cited

U.S. PATENT DOCUMENTS

| | | | |
|---|---|---|---|
| 5,367,626 A | 11/1994 | Morioka et al. | |
| 5,530,853 A * | 6/1996 | Schell | G06F 17/30699 |
| 5,917,489 A | 6/1999 | Thurlow et al. | |
| 6,014,502 A * | 1/2000 | Moraes | G06Q 10/107 |
| | | | 709/219 |
| 6,216,122 B1 | 4/2001 | Elson | |
| 6,226,630 B1 | 5/2001 | Billmers | |
| 6,243,684 B1 * | 6/2001 | Stuart | G10L 15/26 |
| | | | 704/246 |
| 6,243,724 B1 | 6/2001 | Mander et al. | |
| 6,314,421 B1 | 11/2001 | Sharnoff et al. | |
| 6,314,439 B1 | 11/2001 | Bates et al. | |
| 6,370,526 B1 | 4/2002 | Agrawal et al. | |
| 6,546,417 B1 | 4/2003 | Baker | |
| 6,592,627 B1 | 7/2003 | Agrawal et al. | |
| 6,633,413 B1 * | 10/2003 | Schlank | H04N 1/00204 |
| | | | 358/407 |
| 6,678,705 B1 | 1/2004 | Berchtold et al. | |
| 6,725,228 B1 | 4/2004 | Clark et al. | |
| 6,772,143 B2 | 8/2004 | Hung | |
| 6,804,687 B2 * | 10/2004 | Sampson | G06F 17/30067 |
| 7,010,565 B2 * | 3/2006 | Sampson | G06F 17/30067 |
| | | | 707/E17.01 |
| 7,054,906 B2 | 5/2006 | Levosky | |
| 7,080,099 B2 | 7/2006 | Tada et al. | |
| 7,097,096 B2 | 8/2006 | Nakazono | |
| 7,233,961 B2 * | 6/2007 | Sampson | G06F 17/30067 |
| 7,257,201 B2 | 8/2007 | Singh et al. | |
| 7,340,504 B2 * | 3/2008 | Hyakutake | G06F 17/30011 |
| | | | 707/E17.008 |
| 7,409,424 B2 | 8/2008 | Parker | |
| 7,421,472 B1 * | 9/2008 | Ross, Jr. | G06Q 10/107 |
| | | | 709/206 |
| 7,567,657 B2 | 7/2009 | Foxenland | |
| 7,571,458 B1 * | 8/2009 | Eyal | H04M 3/53 |
| | | | 348/468 |
| 7,584,253 B2 | 9/2009 | Curbow et al. | |
| 7,584,254 B2 | 9/2009 | Adams et al. | |
| 7,593,992 B2 | 9/2009 | Wodtke et al. | |
| 7,596,594 B2 | 9/2009 | Karp | |
| 7,672,940 B2 | 3/2010 | Viola et al. | |
| 7,716,217 B2 | 5/2010 | Marston et al. | |
| 7,730,146 B1 | 6/2010 | Mace et al. | |
| 7,761,429 B2 | 7/2010 | Polimeni | |
| 7,765,212 B2 | 7/2010 | Surendran et al. | |
| 7,769,144 B2 | 8/2010 | Yao et al. | |
| 7,774,242 B2 | 8/2010 | Kubach et al. | |
| 7,822,738 B2 | 10/2010 | Anderson et al. | |
| 7,856,479 B2 | 12/2010 | Bellegarda et al. | |
| 7,870,206 B2 * | 1/2011 | Heidloff | G06Q 10/107 |
| | | | 709/200 |
| 7,903,793 B2 * | 3/2011 | Visser | H04L 12/66 |
| | | | 379/88.01 |
| 7,913,053 B1 | 3/2011 | Newland | |
| 8,024,412 B2 | 9/2011 | McCann et al. | |
| 8,028,032 B2 | 9/2011 | Laird-McConnell | |
| 8,135,728 B2 | 3/2012 | Yih et al. | |
| 8,161,122 B2 | 4/2012 | Sood et al. | |
| 8,161,171 B2 | 4/2012 | Maes | |
| 8,161,417 B1 | 4/2012 | Lee | |
| 8,185,139 B1 | 5/2012 | Mangal | |
| 8,195,746 B2 * | 6/2012 | Heidloff | H04L 51/18 |
| | | | 709/205 |
| 8,233,594 B2 | 7/2012 | Vaghar et al. | |
| 8,250,088 B2 | 8/2012 | Bondurant et al. | |
| 8,266,218 B2 * | 9/2012 | Keohane | G06Q 10/107 |
| | | | 709/206 |
| 8,370,766 B2 * | 2/2013 | Selig | G06F 17/243 |
| | | | 715/733 |
| 8,392,409 B1 | 3/2013 | Kashyap et al. | |
| 8,407,217 B1 | 3/2013 | Zhang | |
| 8,407,303 B2 | 3/2013 | Wong | |
| 8,438,476 B2 * | 5/2013 | Uhlig | G06F 17/212 |
| | | | 715/251 |
| 8,495,045 B2 | 7/2013 | Wolf et al. | |
| 8,510,664 B2 | 8/2013 | Rueben et al. | |
| 8,631,065 B2 | 1/2014 | Dargahi et al. | |
| 8,631,079 B2 | 1/2014 | Affronti et al. | |
| 8,806,331 B2 * | 8/2014 | Grosz | G06F 17/3028 |
| | | | 715/243 |
| 8,810,660 B2 * | 8/2014 | Tomat | G06F 3/0481 |
| | | | 348/207.1 |
| 8,838,718 B2 | 9/2014 | Almedia | |
| 9,124,542 B2 | 9/2015 | Low et al. | |
| 9,363,147 B2 * | 6/2016 | Quillen | H04L 67/36 |
| 9,582,174 B2 * | 2/2017 | Kamiyama | G06F 3/0486 |
| 9,816,885 B2 | 11/2017 | Bertholds et al. | |
| 2002/0019737 A1 * | 2/2002 | Stuart | G10L 15/26 |
| | | | 704/275 |
| 2002/0049868 A1 | 4/2002 | Okada et al. | |
| 2002/0087584 A1 * | 7/2002 | Hung | H04M 1/72547 |
| 2002/0099681 A1 | 7/2002 | Gainey et al. | |
| 2002/0143885 A1 * | 10/2002 | Ross, Jr. | G06Q 10/107 |
| | | | 709/207 |
| 2002/0161862 A1 | 10/2002 | Horvitz | |
| 2002/0188685 A1 | 12/2002 | Bhogal et al. | |
| 2003/0065728 A1 | 4/2003 | Milovanovic | |
| 2003/0160825 A1 * | 8/2003 | Weber | G06F 3/0486 |
| | | | 715/769 |
| 2003/0187937 A1 | 10/2003 | Yao et al. | |
| 2003/0195937 A1 | 10/2003 | Kircher, Jr. et al. | |
| 2004/0064434 A1 * | 4/2004 | Sampson | G06F 17/30067 |
| 2004/0073621 A1 * | 4/2004 | Sampson | G06F 17/30067 |
| | | | 709/209 |
| 2004/0128353 A1 | 7/2004 | Goodman et al. | |
| 2004/0133645 A1 | 7/2004 | Massanelli et al. | |
| 2004/0218226 A1 * | 11/2004 | Antognini | H04N 1/00209 |
| | | | 358/402 |
| 2004/0243677 A1 | 12/2004 | Curbow et al. | |
| 2005/0050146 A1 | 3/2005 | Jani et al. | |
| 2005/0080642 A1 | 4/2005 | Daniell | |
| 2005/0102358 A1 | 5/2005 | Gold et al. | |
| 2005/0108335 A1 | 5/2005 | Naick et al. | |
| 2005/0198147 A1 | 9/2005 | Pastry et al. | |
| 2005/0198153 A1 * | 9/2005 | Keohane | G06Q 10/107 |
| | | | 709/206 |
| 2005/0234281 A1 * | 10/2005 | Bjorklund | C07C 1/20 |
| | | | 585/639 |
| 2005/0234896 A1 * | 10/2005 | Shima | G06F 16/58 |
| 2005/0251456 A1 | 11/2005 | Perkowski | |
| 2006/0015566 A1 * | 1/2006 | Sampson | H04L 51/12 |
| | | | 709/206 |
| 2006/0070007 A1 * | 3/2006 | Cummins | G06F 16/2428 |
| | | | 715/769 |
| 2006/0101390 A1 * | 5/2006 | Lasker | G06F 8/20 |
| | | | 717/107 |
| 2006/0106782 A1 | 5/2006 | Blumenau et al. | |
| 2006/0143199 A1 * | 6/2006 | Peterson | H03M 7/30 |
| 2006/0177007 A1 | 8/2006 | Vaghar et al. | |
| 2006/0206570 A1 * | 9/2006 | Heidloff | H04L 51/08 |
| | | | 709/206 |
| 2006/0277195 A1 | 12/2006 | Schulz et al. | |
| 2007/0016872 A1 * | 1/2007 | Cummins | G06F 3/0486 |
| | | | 715/769 |
| 2007/0061400 A1 | 3/2007 | Parsons | |
| 2007/0067399 A1 | 3/2007 | Kulkarni et al. | |
| 2007/0112764 A1 * | 5/2007 | Yih | G06F 17/241 |
| 2007/0143472 A1 | 6/2007 | Clark et al. | |
| 2007/0180060 A1 | 8/2007 | Patel et al. | |

(56) References Cited

U.S. PATENT DOCUMENTS

| | | |
|---|---|---|
| 2007/0244907 A1 | 10/2007 | Hedloy |
| 2007/0291911 A1* | 12/2007 | Visser .................. H04L 12/66 |
| | | 379/88.13 |
| 2008/0126951 A1 | 5/2008 | Sood et al. |
| 2008/0178073 A1 | 7/2008 | Gao et al. |
| 2008/0201668 A1 | 8/2008 | Roy |
| 2008/0250084 A1 | 10/2008 | Polimeni |
| 2008/0306972 A1* | 12/2008 | Wilkin .................. H04L 51/066 |
| 2009/0007012 A1 | 1/2009 | Mandic et al. |
| 2009/0049123 A1 | 2/2009 | Dargahi et al. |
| 2009/0059014 A1* | 3/2009 | Rothschild .......... H04N 1/32112 |
| | | 348/207.1 |
| 2009/0094514 A1 | 4/2009 | Dargahi et al. |
| 2009/0150406 A1 | 6/2009 | Giblin |
| 2009/0157819 A1* | 6/2009 | Hampton .............. H04L 51/066 |
| | | 709/206 |
| 2010/0011300 A1* | 1/2010 | AlHusseini ............ H04L 67/38 |
| | | 715/747 |
| 2010/0045567 A1* | 2/2010 | Lin ........................ G06F 3/1454 |
| | | 345/1.1 |
| 2010/0057864 A1 | 3/2010 | Laid-McConnell |
| 2010/0076989 A1 | 3/2010 | Jakobson |
| 2010/0179833 A1* | 7/2010 | Roizen .................... G06Q 50/10 |
| | | 705/3 |
| 2010/0198925 A1 | 8/2010 | Katis et al. |
| 2010/0279667 A1* | 11/2010 | Wehrs .................... G06Q 30/02 |
| | | 455/414.1 |
| 2011/0072086 A1 | 3/2011 | Newsome et al. |
| 2011/0072492 A1* | 3/2011 | Mohler ................ G06F 3/04817 |
| | | 726/3 |
| 2011/0083078 A1 | 4/2011 | Ju |
| 2011/0085205 A1 | 4/2011 | Ouchi |
| 2011/0105095 A1 | 5/2011 | Kedefors et al. |
| 2011/0249024 A1* | 10/2011 | Arrasvuori .............. G06F 3/017 |
| | | 345/629 |
| 2011/0255113 A1* | 10/2011 | Wei ................... G06F 17/30011 |
| | | 358/1.13 |
| 2011/0265022 A1* | 10/2011 | Kamiyama ........... G06F 3/0486 |
| | | 715/769 |
| 2012/0030264 A1 | 2/2012 | Horn |
| 2012/0143894 A1 | 6/2012 | Ferguson et al. |
| 2012/0191797 A1* | 7/2012 | Masonis .............. G06F 21/6245 |
| | | 709/206 |
| 2012/0215572 A1* | 8/2012 | Schneur .................. G06Q 30/06 |
| | | 705/5 |
| 2012/0278341 A1 | 11/2012 | Ogilvy et al. |
| 2012/0296909 A1 | 11/2012 | Cao et al. |
| 2013/0007647 A1* | 1/2013 | Kamiyama ........... G06F 3/0486 |
| | | 715/769 |
| 2013/0218885 A1 | 8/2013 | Satyanarayanan |
| 2013/0254641 A1* | 9/2013 | Kamata .............. H04N 1/00222 |
| | | 715/202 |
| 2014/0122482 A1* | 5/2014 | Auger .................. G06F 16/185 |
| | | 707/736 |
| 2015/0161246 A1* | 6/2015 | Liu ........................ G06F 3/0233 |
| | | 707/722 |

OTHER PUBLICATIONS

Notice of Allowance for U.S. Appl. No. 12/964,267 dated Sep. 29, 2015, 21 pages.

Office Action for U.S. Appl. No. 12/964,267 dated Jun. 2, 2015, 40 pages.

Office Action for U.S. Appl. No. 12/964,267 dated Dec. 10, 2014, 54 pages.

Office Action for U.S. Appl. No. 12/964,267 dated Jul. 8, 2014, 70 pages.

Office Action for U.S. Appl. No. 12/964,267 dated Jan. 16, 2013, 44 pages.

Office Action for U.S. Appl. No. 12/964,267 dated May 8, 2013, 50 pages.

Segal et al., "Incremental Learning in SwiftFile", published 2000, In Proceedings of the Seventh International Conference on Machine Learning. Retrieved on Jun. 28, 2014, 11 pages.

Novell, Inc. "Evolution 2.28 User Guide" (http://projects.gnome.org/evolution/doc/evolution228.pdf) dated Jul. 2007. Retrieved on Jan. 16, 2013, 173 pages.

* cited by examiner

INTELLIGENT MESSAGE PROCESSING

CROSS-REFERENCE TO RELATED APPLICATION

This application is a continuation of, and claims priority to, U.S. patent application Ser. No. 12/964,267, filed Dec. 9, 2010, and entitled "INTELLIGENT MESSAGE PROCESSING," the entirety of which is incorporated herein by reference.

TECHNICAL FIELD

The subject specification generally relates to electronic communication services, e.g., to techniques for intelligent message processing.

BACKGROUND

Communication device users often use their communication devices (e.g., computer, mobile phone, electronic notepad, electronic netbook, etc.) to receive and send electronic messages (e.g., emails, text messages, multimedia messages). Some users (e.g., business persons, attorneys, legal assistants, etc.) often receive dozens to hundreds of electronic messages every day. Managing the high volume of electronic messages can be very time consuming for users. For instance, when a user receives an email regarding a particular business matter, the user can desire to save the email to an electronic folder relating to that business matter. Currently, the user has to search for and locate the folder and move (e.g., drag) the email to and/or save the email in the folder. Performing such searching, locating, moving, and other message processing for a high volume of messages each day can be very time consuming and an inefficient use of the user's time.

Further, in addition to the messages themselves, some messages can have, for example, attachments (e.g., electronic files, such as word processing documents, portable document format (PDF) documents, music or video files, etc.), links to online pages or sites (e.g., web pages or web sites), contact information relating to the message sender or others, etc., wherein the user can desire to save an attachment, a link, contact information, or other information, which was received in a message, in a desired electronic folder or open and perceive (e.g., view) the documents or play the file using a desired application. Currently, to save the attachment, link, or information in a desired folder, like with the message itself, the user must search for and locate the folder and move (e.g., drag) the attachment, link, or information to and/or save it in the folder. Again, performing such searching, locating, moving, and other processing of attachments, links, or other information for a high volume of messages each day can be very time consuming and an inefficient use of the user's time.

The above-described deficiencies of today's systems are merely intended to provide an overview of some of the problems of conventional systems, and are not intended to be exhaustive. Other problems with the state of the art and corresponding benefits of some of the various non-limiting embodiments may become further apparent upon review of the following detailed description.

DETAILED DESCRIPTION

Figure 1:
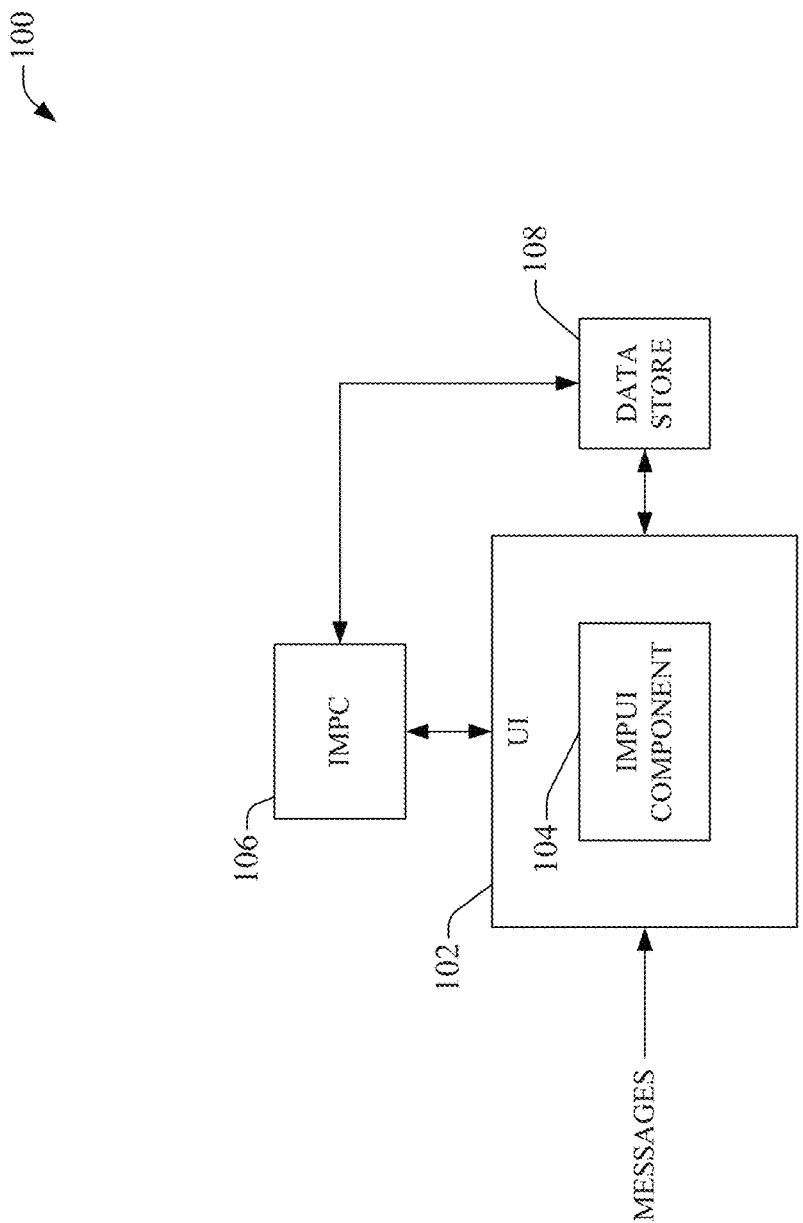
FIG. 1 is a block diagram of an example system that can intelligently process messages in accordance with various aspects and embodiments of the disclosed subject matter.

Systems, methods, and devices that provide for intelligent message processing are presented. In accordance with various aspects, with regard to a message, an intelligent message processor component (IMPC) can intelligently identify a desired file folder and archive the message in the folder in response to as little as one user interface (UI) control manipulation (e.g., mouse click, button press, display screen touch, or key stroke), when the intelligent message processor UI (IMPUI) component is activated. In an aspect, when the IMPUI component is activated (e.g., in response to selection of a message processing control, such as an ARCHIVE control), the IMPC can automatically parse the message and identify, or can allow the user to identify, a keyword(s) or keyphrase(s) in the message that can be indicative of the file folder in which storage of the message, and/or related attachments, links or information (e.g., contact information contained in the message, time deadline information, etc.), is or may be desired. The IMPC can automatically identify the desired file folder, or one or more potentially desired file folders, based at least in part on the identified keyword(s) or keyphrase(s) and tag words or phrases respectively associated with file folders stored in the data store. If there is only one file folder in the data store that is associated with an identified keyword or keyphrase, the message can be stored (e.g., automatically stored) in the folder, if the user selects the identified keyword or keyphrase in the message, which can be performed with as little as one UI control manipulation (e.g., the message can be stored in the desired file folder in response to as little as one click on or selection of the identified keyword or keyphrase), without the user having to search for and locate the file folder in the directory of the data store. If the identified keyword or keyphrase is associated with more than one potentially desired file folder, in response to receiving input from the user selecting the identified keyword or keyphrase, the IMPC can present (e.g., display) a choice of potentially desired file folders to the user on the display screen of the IMPUI component. The user can manipulate (e.g., click on or select) the desired file folder from the presented potentially desired file folders, and the IMPC can store the message in the selected file folder. The IMPUI also can comprise other message processing controls, including desired custom message processing controls (e.g., created by the user, third party developers, etc.), that can be utilized, for example, to forward a message to another user, archive the message or related attachment in a remote storage destination, play an audio or a video file attached to the message, access and store an online page or site associated with a link contained in the message, or perform another desired customized message process on the message, etc.

In accordance with various aspects, the disclosed subject matter can comprise a system that includes an IMPC that is configured to analyze a message in accordance with at least one selected message processing control to facilitate process of the message. The system can further include an IMPUI component that is configured to present a subset of message processing controls usable to take at least one action relating to the process of the message.

In accordance with various other aspects, the disclosed subject matter can comprise a method that includes the acts of analyzing a message based at least in part on at least one selected message processing control; and performing at least one message processing action relating to the at least one selected message processing control.

In accordance with still other aspects, the disclosed subject matter can comprise a communication device that includes an IMPC that is configured to analyze a message in accordance with at least one selected message processing control to facilitate process of the message. The communication device can further include an IMPUI component that is configured to present a subset of message processing controls usable to take at least one action relating to process of the message.

The following description and the annexed drawings set forth in detail certain illustrative aspects of the disclosed subject matter. These aspects are indicative, however, of but a few of the various ways in which the principles of the various embodiments may be employed and the disclosed subject matter is intended to include all such aspects and their equivalents. Other advantages and distinctive features of the disclosed subject matter will become apparent from the following detailed description of the various embodiments when considered in conjunction with the drawings.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

As used in this application, the terms "component," "system," "platform," "interface," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Communication device users often use their communication devices (e.g., computer, mobile phone (e.g., cellular phone, smart phone), personal digital assistant (PDA), electronic notepad, electronic netbook, electronic gaming device, another type of electronic device with communication capabilities, etc.) to receive and send electronic messages (e.g., emails, text messages, multimedia messages). Some users (e.g., business persons, attorneys, legal assistants, etc.) often receive dozens to hundreds of electronic messages each day. Managing the high volume of electronic messages can be very time consuming for users. For instance, when a user receives an email regarding a particular business matter, the user can desire to save the email, and/or related attachment (e.g., word processing document, portable document format (PDF) document, music or video file, etc.) or links (e.g., link to an online page or site), to an electronic file folder relating to that business matter. Today, the user has to search for and locate the file folder in the directory and move (e.g., drag) the email or related attachment to and/or save the email or related attachment in the file folder. Performing such searching, locating, moving, and other message processing for a high volume of messages each day can be very time consuming and an inefficient use of the user's time. It is desirable to overcome these and other deficiencies in conventional messaging systems and methods.

To that end, systems, methods, and devices that provide for intelligent message processing are presented. In accordance with various aspects, with regard to a message, an intelligent message processor component (IMPC) can intelligently identify a desired file folder and archive the message in the folder in response to as little as one user interface (UI) control manipulation (e.g., mouse click, button press, display screen touch, or key stroke), when the intelligent message processor UI (IMPUI) component is activated. In an aspect, when the IMPUI component is activated (e.g., in response to selection of a message processing control, such as an ARCHIVE control), the IMPC can automatically parse the message and identify, or can allow the user to identify, a keyword(s) or keyphrase(s) in the message that can be indicative of the file folder in which storage of the message, and/or related attachments, links or information (e.g., contact information contained in the message, time deadline information, etc.), is or may be desired. The IMPC can automatically identify the desired file folder, or one or more potentially desired file folders, based at least in part on the identified keyword(s) or keyphrase(s) and tag words or phrases respectively associated with file folders stored in the data store. If there is only one file folder in the data store that is associated with an identified keyword or keyphrase, the message can be stored (e.g., automatically stored) in the folder, if the user selects the identified keyword or keyphrase in the message, which can be performed with as little as one UI control manipulation (e.g., the message can be stored in the desired file folder in response to as little as one click on or selection of the identified keyword or keyphrase), without the user having to search for and locate the file folder in the directory of the data store. If the identified keyword or keyphrase is associated with more than one potentially desired file folder, in response to receiving input from the user selecting the identified keyword or keyphrase, the IMPC can present (e.g., display) a choice of potentially desired file folders to the user on the display screen of the IMPUI component. The user can manipulate (e.g., click on or select) the desired file folder from the presented potentially desired file folders, and the IMPC can store the message in the selected file folder. The IMPUI also can comprise other message processing controls, including desired custom message processing controls (e.g., created by the user, third party developers, etc.), that can be utilized, for example, to forward a message to another user, archive the message or related attachment in a remote storage destination, play an audio or a video file attached to the message, access and store an online page or site associated with a link contained in the message, or perform another desired customized message process on the message, etc.

Referring to the drawings, FIG. 1 is a block diagram of an example system 100 that can intelligently process messages in accordance with various aspects and embodiments of the disclosed subject matter. In an aspect, the system 100 can include a user interface (UI) component 102 that can provide one or more desired user interfaces, such as, for example, display screen(s), controls, or other components, that a user can utilize to interact with the UI component 102 and associated components of the system 100 to facilitate performing desired actions, including, for example, actions relating to the processing of messages (e.g., electronic mail (email), text message, multimedia message, etc.) and/or related attachments or links (e.g., link to an online page or site). In an aspect, the UI component 102 can be or can comprise an intelligent message processor UI (IMPUI) component 104 that can be employed to facilitate intelligently and efficiently processing messages (e.g., received messages, sent messages) to archive, forward, play message attachments, store message attachments, access links in messages, store pages or sites associated with links in messages, etc., to facilitate reducing or minimizing the actions and time required of a user to desirably process the messages (e.g., received messages and/or messages being sent). In accordance with various embodiments, the UI component 102 and/or IMPUI component 104 can comprise a graphical UI (GUI) or touch screen GUI.

As depicted, the UI component 102 is a separate entity that can be utilized with other components of system 100. However, it is to be appreciated that the UI component 102 and/or similar view components can be incorporated into another component of the system 100 and/or a stand-alone unit. The UI component 102 and/or IMPUI component 104 can provide one or more GUIs, command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the system 100.

The user can also interact with the regions to select and provide information via various devices such as a mouse, a trackpad (e.g., a single-touch or multi-touch trackpad), a roller ball, a keypad, a keyboard, a pen and/or voice activation, for example. Typically, a mechanism such as a push button or the enter key on the keyboard can be employed subsequent to entering the information in order to initiate the search. However, it is to be appreciated that the disclosed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays with limited graphic support, and/or low bandwidth communication channels.

In accordance with various aspects, the system 100 can comprise an intelligent message processor component (IMPC) 106 that can be associated with (e.g., connected to) the UI component 102 to facilitate intelligently processing messages received by, presented on, or being sent via, the UI component 102. In accordance with various aspects, with regard to a message (e.g., a message in a message display interface associated with a message application), the IMPC 106 can intelligently identify a desired file folder (e.g., in a data store 108, archive, or repository) and archive (e.g., store) the message in the file folder or take another desired action with regard to the message or associated content (e.g., attachment, link), in response to as little as one UI control manipulation (e.g., mouse click, touching a button on a touch-screen display screen, button press, or key stroke, etc.), when the IMPUI component 104 is activated.

For instance, in an aspect, the IMPUI component 104 can be activated by selecting a desired message processing control (e.g., ARCHIVE control or other desired message processing control, such as disclosed herein). When the IMPUI component 104 is activated (e.g., when the ARCHIVE control or other desired message processing control is selected), the IMPC 106 can automatically parse the message and identify, or can allow the user to identify and select, a keyword(s) or keyphrase(s) in the message that can be indicative of, or associated with, the file folder in which storage of the message, and/or related attachments, links or information (e.g., contact information contained in the message, time deadline information, etc.), is or may be desired. The IMPC 106 can automatically identify the desired file folder, or a subset of potential file folders, in a data store 108, based at least in part on the identified keyword(s) or keyphrase(s) in or associated with the message (e.g., when the keyword or keyphrase is selected by the user). The IMPC 106 can store the message and/or associated information (e.g., attached file, link in the message, etc.) in the desired file folder (e.g., when only one file folder is associated with the selected keyword or keyphrase), or can present (e.g., display) a choice of potential file folders associated with the selected keyword or keyphrase, to the user in the IMPUI component 104. If the IMPC 106 determines that no file folder relating to the message currently exists in the data store 108 or the user does not desire to store the message in the identified file folder(s), the IMPUI component 104 and/or IMPC 106 can allow the user to create a new file folder when desired (e.g., if no file folder is identified, or if none of the potential file folders is a file folder desired by the user).

Figure 2:
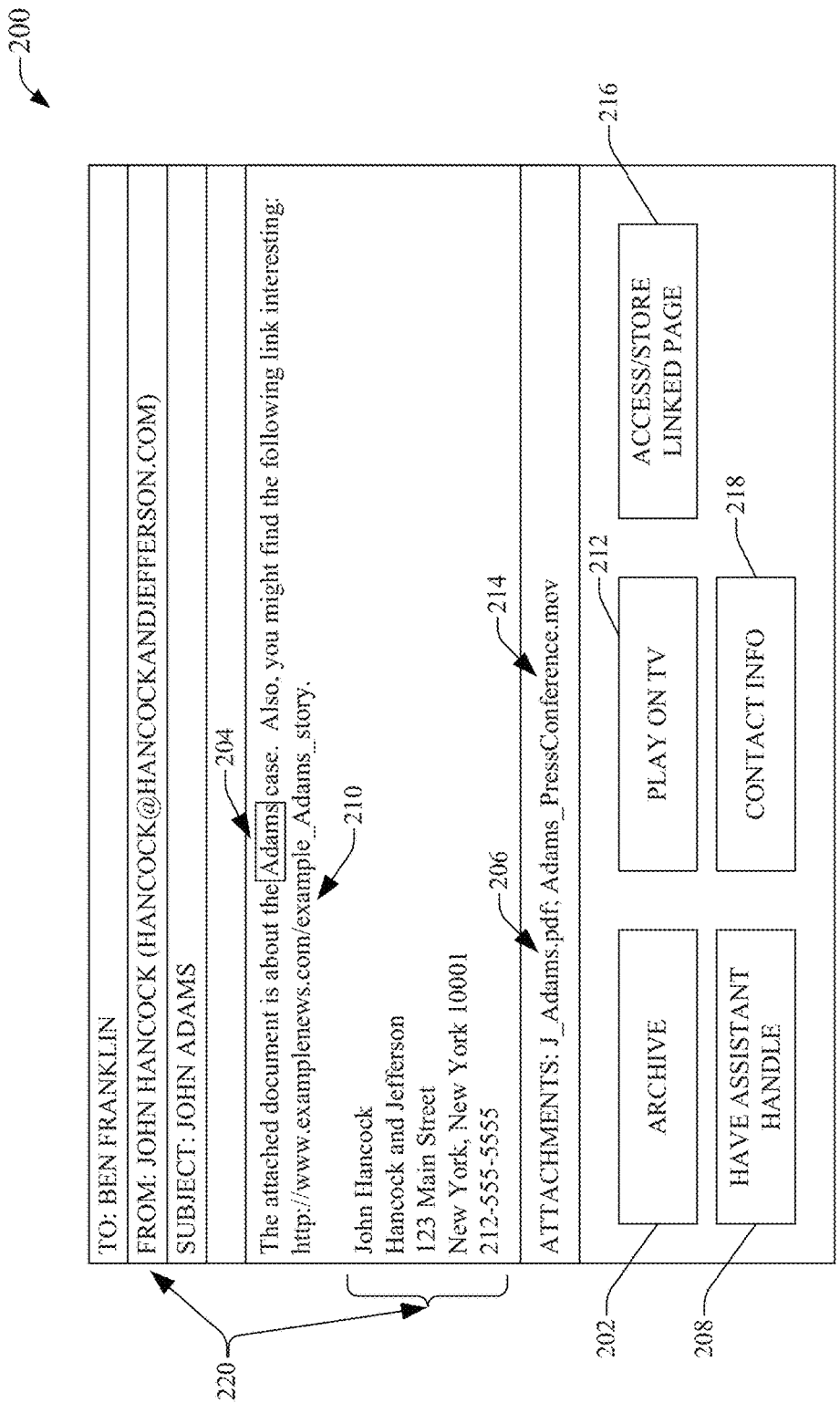
FIG. 2 depicts a diagram of an example email message that can be intelligently processed in accordance with various aspects of the disclosed subject matter.

Referring briefly to FIG. 2 (along with FIG. 1), depicted is a diagram of an example email message 200 that can be displayed on the display screen of the IMPUI component 104 and intelligently processed using the IMPC 106 and IMPUI 104 (of FIG. 1) in accordance with various aspects of the disclosed subject matter. The IMPUI 104 can present (e.g., display) the email message 200 to a user, such as the intended recipient of the message, who, in this example email message, is Ben Franklin. For example, the example email message 200 can be received by an email server (not shown in FIG. 2) and presented in the IMPUI 104. In this example email message 200, the message sender is "John Hancock" and the subject of the message is "John Adams". In the body of the example email message 200, a portion of the message states: "The attached document is about the Adams case. Also, you might find the following link interesting: http://www.examplenews.com/example_Adams_story."

In an aspect, if the user desires to archive the message in the desired file folder (e.g., the "Adams" file folder), the user can select (e.g., press) the ARCHIVE control 202 on the IMPUI component 104, wherein the selection of the ARCHIVE control 202 can activate the IMPUI component 104 and associated IMPC 106 to begin to process (e.g., intelligently process) the email message 200. The IMPC 106 can parse information associated with the email message 200, wherein the information to be parsed can comprise, for example, the intended message recipient, message sender, information in the subject header, information in the body of the message, attachments (e.g., name of an attachment, information in the attachment, metadata or properties associated with the attachment, etc.), metadata (e.g., date information, flag or priority information, message properties, etc.) associated with the message, etc. When parsing the email message 200 and associated information, the IMPC 106 can employ desired predefined parsing criteria to facilitate identifying a keyword(s) or keyphrase(s) in the email message 200 or associated information. The predefined parsing criteria can relate to, for example, the number of times a particular term/phrase is used in the message or associated information, the location of the term/phrase in the message or associated information (e.g., term in the subject header can have more weight, and thus be more indicative of a desired keyword, than another term in the body of a document attached to the message), respective weights of respective terms or phrases associated with the message (e.g., weighting of a term or phrase can be based at least in part on location of term or phrase in the message, type of word, whether the term or phrase matches or is at least substantially similar to a known tag word or phrase, format of the term or phrase, etc.), the names of current file folders stored in the data store 108, the file names and/or content currently stored in the current file folders, the type of word (e.g., name, noun, verb, preposition, etc.), the format of the alphanumeric characters (e.g., whether a set of alphanumeric characters (e.g., an alphanumeric term or phrase) matches or is at least substantially similar to a known format associated with file folder names or client identifiers), etc.

For instance, the IMPC 104 can analyze the information in and associated with the email message 200 and, employing the predefined parsing criteria, the IMPC 106 can identify (e.g., automatically identify) the word "Adams" 204 in the email message 200 as being a keyword that is the same as or relates to a file folder name (e.g., file folder named Adams and/or tagged with the word "Adams" to associate such file folder with the word "Adams") stored in the data store 108, which can be associated with the IMPUI component 104 and IMPC 106. For example, the IMPC 106 can compare the word "Adams" to current file folder names, or tag words associated with respective current file folder names, to facilitate identifying "Adams" as a keyword (e.g., when "Adams" is identified as matching a current file folder name or associated tag). When a word or phrase in the message (e.g., message 200) is identified as a keyword or keyphrase, based at least in part on a tag word or phrase, the IMPC 106 can associate (e.g., temporarily associate) the identified keyword or keyphrase with the file folder(s) associated with the tag word or phrase, during the processing of the message. The IMPC 104 can facilitate highlighting or emphasizing the keyword "Adams" 204 in the message in the message display region of the IMPUI component 106. For example, the keyword "Adams" 204 can be highlighted or emphasized (e.g., automatically highlighted or emphasized) to distinguish or differentiate it from other words in the message in the message display region of the IMPUI component 104 by encasing the keyword in a block (as depicted in FIG. 2) or, by coloring to a desired color (e.g., yellow) the space wherein the keyword resides on the display screen, by coloring to a desired color (e.g., yellow) the characters (e.g., letters, numbers, other characters) of the keyword, by using a pointer to point to the keyword, etc. With regard to the example email message 200, additionally or alternatively, any of the one or more other instances of the keyword "Adams", for example, as shown in the subject header, the link, and/or the file name of the attached file, can be identified and highlighted by the IMPC 106 in the message 200, as desired.

In accordance with an aspect, in certain instances, more than one different word or phrase can or may be identified in a message (e.g., "Adams" 204 and "Hancock" in the message 200 may both be identified as keywords or potential keywords when in accordance with the predefined parsing criteria). In such certain instances, the respective different words or phrases can be highlighted or emphasized as respective identified keywords or keyphrases, wherein the IMPC 106 and/or IMPUI component 104 can highlight or emphasize the respective different words or phrases in a same manner (e.g., using same highlight color for each different word) or a different manner (e.g., using different highlight colors for each different word), as desired.

In another aspect, the user can perceive the highlighted or emphasized keyword "Adams" 204 in the message display region of the IMPUI component 104, and can select the keyword "Adams" 204, for example, by mouse clicking on the keyword "Adams" 204 or providing other selection input to the IMPUI component 104 (e.g., pressing the TAB button until the keyword "Adams" 204 is further or differently highlighted (e.g., highlighted to a different color) to indicate it is selected and pressing the ENTER key; moving fingertip(s) on a trackpad to move a cursor (e.g., cursor, arrow icon, hand icon, etc.) on or over the keyword "Adams" and pressing the trackpad button to select the keyword "Adams"). In response to the selection of the keyword "Adams" 204, the IMPC 106 and/or IMPUI component 104 can facilitate storing (e.g., automatically storing) the email message 200 in the appropriate file folder (e.g., ADAMS file folder) in the data store 108. As a result, in contrast to conventional message processing systems, the user can activate the IMPUI component 104 and, with as little as one mouse click on a keyword by the user, the email message can be stored in the desired file folder in the data store 108, without requiring the user to search for and locate the desired file folder in the directory and then dragging the email message or selecting a save command to store the email message in the desired file folder. When using the IMPUI component 104 and IMPC 106 for intelligent message processing, the structure of the archive (e.g., data store 108) can effectively be "invisible" to the user as a desired portion (e.g., one or more file folders associated with a particular keyword or tag name) of the archive can be brought to (e.g., presented or displayed to) the user, instead of the user having to search for and locate the desired file folder in the archive and move the message to the desired file folder in the archive. The subject specification can thereby save time and manual effort of the user in managing email messages.

In still another aspect, if a potential keyword or keyphrase does not exactly match, but is substantially similar to, a file folder name or associated tag word or phrase (e.g., tag word is "Adams", but word in message is spelled "Addams"), the IMPC 106 can highlight or emphasize such word or phrase in the message differently than the highlight or emphasis used when the word or phrase is an exact match. Such different highlighting or emphasis (e.g., use of different color or different type of emphasis) of a potential keyword or keyphrase, which does not exactly match but is substantially similar to a file folder name or associated tag word or phrase, can indicate to the user that the potential keyword or keyphrase may be a desired keyword or keyphrase that is associated with a desired file folder, but the level of confidence that the keyword or keyphrase is associated with a desired filed folder is lower than the confidence level associated with a keyword or keyphrase that exactly matches a file folder name or associated tag.

In yet another aspect, as an alternative to or in addition to the IMPC 106 automatically identifying a keyword(s) or keyphrase(s) in the email message 200, the user, using the IMPUI component 104, can manually select one or more words or phrases in the email message 200 as a keyword(s) or keyphrase(s) to facilitate identifying the desired file folder in which to store the email message 200 or performing another desired action, as more fully disclosed herein, with regard to the email message 200. The IMPUI component 104 can store the message is a file folder associated with a manually selected keyword or keyphrase, or can present one or more potential file folders associated with the manually selected keyword or keyphrase, wherein a file folder of the potential file folders can be selected by the user and the message can be stored in the selected file folder.

If, for a particular keyword or keyphrase, there is more than one file folder that is associated with the particular keyword or keyphrase (e.g., when the tag is the name of a client and there are multiple file folders associated with that client), the IMPC 106 can identify and the IMPUI component 104 can display the subset of file folders, which are associated with the particular keyword or keyphrase, in the display region of the IMPUI component 106. The user can select the desired file folder from the subset of file folders, and the IMPC 106 and/or IMPUI component 104 can facilitate storing the message or other associated information in the selected file folder.

In still another aspect, as an alternative to or in addition to selecting a keyword or keyphrase to facilitate intelligent message processing of a message in accordance with a desired message processing control (e.g., ARCHIVE control, PLAY ON TV control, etc.), the user can select a keyword or keyphrase in the message via an interface(s) of the IMPUI component 104, and can drag the keyword or keyphrase over the desired message processing control in the display screen using the interface(s) of the IMPUI component 104 to facilitate selecting the desired message processing control, and, in response, the IMPC 106 and/or IMPUI component 104 can select and activate the desired message processing control, and can perform the desired intelligent message processing in accordance with the selected keyword or keyphrase and the selected message processing control (e.g., when the keyword "Adams" 204 is selected and dragged over the ARCHIVE control 202 to select the ARCHIVE control 202 (e.g., wherein the drag can be ended by hovering "Adams" 204 over the ARCHIVE control and releasing the interface control or button to stop dragging of "Adams" 204), the message can be stored in the file folder associated with "Adams" 204 or a subset of file folders associated with the keyword "Adams" 204 can be presented to the user so the user can select the desired file folder from the subset in which to store the message).

In another aspect, if the email message 200 has an attachment, such as J_Adams.pdf 206, and user desires to save the attachment, but not the message 200 itself, the IMPUI component 104 can enable the user to efficiently save the attachment in the desired file folder. The user can select the ARCHIVE control 202 to activate the intelligent message processing, select the attachment (e.g., J_Adams.pdf 206), which can be highlighted or emphasized as desired (e.g., highlighted using a desired color (e.g., green)) when selected, and can select the identified keyword or keyphrase (e.g., "Adams" 204) associated with the file folder in which storage of the attachment is desired. In response to those user selections, the IMPC 106 and/or IMPUI component 104 can store the attachment (e.g., J_Adams.pdf 206) in the file folder associated with the keyword or keyphrase (e.g., "Adams" 204). Thus, after activation of the IMPUI component 104 to begin the intelligent message processing, the attachment can be quickly stored in the desired file folder in the data store 108 in as little as two interface manipulations (e.g., two mouse clicks).

As another example, the IMPUI component 104 can include a HAVE ASSISTANT HANDLE control 208 that can be employed to forward the email message 200 and/or the attachment, J_Adams.pdf 206, and/or the link, http://www.examplenews.com/example_Adams_story 210, to another desired destination, such as the email box of the assistant of the user. In an aspect, the user can select (e.g., press) the HAVE ASSISTANT HANDLE control 208, and the email message 200 can be forwarded to the desired email box, such as the assistant's email box, as specified by the parameter settings of the HAVE ASSISTANT HANDLE control 208. As desired, a preconfigured message or header (e.g., pre-populated message or header), or a custom message or header, can be included in the forwarded message. As desired (e.g., when specified in accordance with the parameter settings), a copy of the email message 200 and/or forwarded message can be created and stored in desired file folder as part of the message processing in response to selection of the HAVE ASSISTANT HANDLE control 208. For instance, similar to the ARCHIVE control 202, the HAVE ASSISTANT HANDLE control 208 can result in the IMPC 106 identifying and highlighting the keyword "Adams" 204, and the user can select the keyword "Adams" 204 to facilitate copying and storing the email message 200 and/or forwarded email message in the desired file folder associated with the keyword "Adams" 204, in addition to creating and sending the forwarded email message. Alternatively, the user can select the ARCHIVE control 202 and the HAVE ASSISTANT HANDLE control 208, and selecting the keyword "Adams" 204 to facilitate archiving the message in the desired file folder and forwarding the email message 200 to the assistant's email box.

As still another example, the IMPUI component 104 can comprise a PLAY ON TV control 212 that can be employed to send a copy of an attachment of a video file, such as the attachment Adams_PressConference.mov 214 in the email message 200, to the data store 108 and/or a remote storage (e.g., digital video recorder (DVR), set-top box (STB)) and to play the video file on the TV. For instance, the user, using the IMPUI component 104, can select the PLAY ON TV control 212 to activate message processing by the IMPUI component 104, and can select the attachment Adams_PressConference.mov 214, and the IMPC 106 and/or IMPUI component 104 can facilitate sending Adams_PressConference.mov 214 (or a copy of such file) to the desired storage location(s) and playing Adams_PressConference.mov 214 on a TV associated with the IMPC 106 or storage location in which Adams_PressConference.mov 214 is stored. Alternatively, when the PLAY ON TV control 212 is selected by the user, if the IMPC 106 detects only one video (or audio) attachment in the email message 200, the IMPC 106 can automatically send the video (or audio) file to the desired storage location (e.g., data store 108, DVR, STB) and play the video (or audio) file on the TV (e.g., the IMPC 106 can automatically send the video (or audio) attachment to the desired location and/or play the video (or audio) file on the TV (or video or audio player) in as little as one mouse click or one interface manipulation, after the PLAY ON TV control 212 has been activated, in accordance with parameter settings associated with the PLAY ON TV control 212).

As yet another example, the IMPUI component 104 can include an ACCESS/STORE LINKED PAGE control 216 that can be employed to access an online page or site that is linked to by a link in the email message 200. In an aspect, the user, using the IMPUI component 104, can select the ACCESS/STORE LINKED PAGE control 216 to activate the intelligent message processing by the IMPUI component 104, and can select or highlight a link, such as http://www.examplenews.com/ExampleAdamsStory 210, in the email message 200. In response, the IMPC 106 can automatically access the online page or site associated with the link and can store a copy of the online page or site in the data store 108 (e.g., in the file folder associated with "Adams"). In another aspect, to facilitate storing the online page or site in the desired file folder in the data store 108, when the ACCESS/STORE LINKED PAGE control 216 is selected, the IMPUI component 104 can prompt the user to select the link (e.g., 210) and select a keyword (e.g., identified keyword, such as "Adams" 204) or keyphrase to identify the desired file folder, and the IMPC 106 and/or IMPUI component 104 can facilitate accessing and storing the online page or site associated with the link in the desired file folder (e.g., file folder associated with the selected keyword) in the data store 108. Alternatively, the user can select the ARCHIVE control 202 and the ACCESS/STORE LINKED PAGE control 216 during the same session, wherein the ARCHIVE control 202 can be employed to facilitate identifying the desired file folder, as disclosed herein, and the ACCESS/STORE LINKED PAGE control 216 can be employed to access and store the linked page or site in the desired file folder, as disclosed herein.

It is to be appreciated and understood that the controls (e.g., ARCHIVE control 202, HAVE ASSISTANT HANDLE control 208, PLAY ON TV control 212, ACCESS/STORE LINKED PAGE control 216) disclosed herein are but a few examples of the controls that can be employed by the system 100, and, in accordance with various embodiments and aspects, other controls that can facilitate intelligent message processing of messages can be employed by the system 100, and all such other such controls are considered to be within the scope of the subject specification.

In accordance with yet another aspect, the IMPUI component 104 can enable a user to create one or more custom controls (e.g., custom programmable controls or options) to facilitate intelligent message processing of messages (e.g., email message 200). The IMPUI component 104 can provide (e.g., display to) the user one or more menus comprising options and/or controls that the user can select to create a custom control that can perform a desired function(s) to facilitate processing messages. The IMPC 106 can receive input relating to the custom control, and can save information (e.g., parameter setting(s), option(s), function(s) selection(s), etc.) relating to the custom control, for example, in the data store 108, and, as desired, the custom control can be displayed with other controls (e.g., ARCHIVE control 202) on a display region of the IMPUI component 104, or can be included in a menu that can be provided to the user. The parameter settings, options, functions, and/or controls can relate to, for example, an application to be used when a particular custom control is selected, a destination (e.g., data store 108, remote storage location, etc.) for the message being processed, a message processing action to take in response to selecting the particular custom control, etc.

In an aspect, the controls (e.g., message processing controls) displayed in the display region of the IMPUI component 104 can be manually selected by the user, can be a default subset of controls presented by the IMPUI component 104, or can be dynamically and/or automatically selected by the IMPC 106 or IMPUI component 104 when a message is displayed in the display region based at least in part on information contained in or associated with the message and/or current or historical information of user activity with regard to utilization of controls in relation to messages. As one example, in a user-selected subset of controls or a default subset of controls displayed in the display region of the IMPUI component 104, there may be no ACCESS/STORE LINKED PAGE control 216 in order to display other desired controls in the display region. However, when a message (e.g., email message 200) is displayed in the display region of the IMPUI component 104 and that message includes a link to an online page or site (e.g., http://www.examplenews.com/ExampleAdamsStory 210), the IMPUI component 104 and/or IMPC 106 can identify (e.g., automatically identify) the link associated with the message, and in response to identifying the link, the IMPC 106 and/or IMPUI component 104 can facilitate dynamically or automatically presenting the ACCESS/STORE LINKED PAGE control 216 in addition to, or instead of, one or more other controls in the display region of the IMPUI component 104 (e.g., portion of the display region that displays controls). Alternatively, the user can be presented with a MORE CONTROLS control or button (not shown) in the display region of the IMPUI component 104 that can allow the user to view more available controls or create a custom control, as desired.

As another example, when a message (e.g., email message 200) is displayed in the display region of the IMPUI component 104 and that message includes an attachment that is a video file, such as Adams_PressConference.mov 214, and a link to an online page, such as http://www.examplenews.com/ExampleAdamsStory 210, in a user selected subset of controls or a default subset of controls displayed in the display region of the IMPUI component 104, there may be no PLAY ON TV control 212 or ACCESS/STORE LINKED PAGE control 216 in order to display other desired controls in the display region (e.g., due in part to size limitations of the portion of the display region that presents the controls). The IMPC 106 can analyze the message to identify that there is a video file and link associated with the message, and can analyze current and historical information associated with the user in relation to messages. If based at least in part on the analysis, the IMPC 106 determines that the current and historical information indicates the user views video files that are included in messages on a relatively frequent basis, but, on a relatively less frequent basis, the user desires to save linked-to online pages associated with links in messages, the IMPC 106 can dynamically determine that the PLAY ON TV control 212 is to be provided (e.g., displayed) in the display region of the IMPUI component 104, but the ACCESS/STORE LINKED PAGE control 216 is not be to provided in the display region of the IMPUI component 104, or, if one of the normally displayed controls is used even less frequently than the ACCESS/STORE LINKED PAGE control 216 or is not relevant to the message, the ACCESS/STORE LINKED PAGE control 216 can be dynamically displayed instead of such normally displayed control.

In still another aspect, when a particular control, such as ARCHIVE control 202, is selected to facilitate identifying a desired file folder in which to store the email message 200, and no file folder is detected by the IMPC 106, the IMPUI component 106 can display a notification and/or prompt to the user to notify the user that no file folder has been detected that relates to any of the potential keywords or keyphrases, and can ask the user whether the user desires to create a new file folder or search for a file folder in the directory in the data store 108. If the user selects the option to create a new folder, a new file folder can be created, the user can name the new file folder, can select a keyword or keyphrase in the email message 200 to name the new file folder, and/or can associate the keyword or keyphrase with the new file folder (e.g., tag the new file folder with the keyword or keyphrase), and the IMPC 106 can associate the keyword or keyphrase with the new file folder and/or can store the email message 200 and/or associated information (e.g., attachment, linked page, etc.) in the new file folder, which can be stored in the data store 108. If the user selects an option to not create a new folder, the IMPUI component 104 can prompt the user to name a desired file folder or search for and locate the desired file folder in the data store 108.

In an aspect, the IMPUI component 104 and IMPC 106 can be employed to intelligently process and store desired information, such as contact information contained in or associated with a message (e.g., email message 200). For instance, the IMPUI component 104 can comprise a CONTACT INFORMATION control 218 (also referred to as CONTACT INFO control 218) that can facilitate storage of contact information, such as a person's name, company name, address, phone number, facsimile number, and/or email address, etc., contained in or associated with a message, such as email message 200, in a contact information file, which can be created to store the contact information. For example, the email message 200 can include contact information 220, comprising the name of the message sender (e.g., "John Hancock"), associated company or firm name of the message sender (e.g., "Hancock and Jefferson"), physical address of the message sender (e.g., "123 Main Street, New York, N.Y. 10001"), phone number of the message sender (e.g., "212-555-5555"), and email address of the message sender (e.g., "hancock@hancockandjefferson.com"). In response to the user selecting the CONTACT INFO control 218, the IMPC 106 can parse the message 200 and can identify the contact information 220 in the message 200 based at least in part on the format of the contact information 220 (e.g., phone number has a known format, email address has a known format, name and address typically is in one of several types of known formats, etc.), the location of the control information 220 in the message 200 (e.g., the email address is known to typically be in the FROM field of the message 200, the name, address and phone number typically appear at or near the bottom (or at or near the top) of the message 200), or other predefined parsing criteria. The IMPUI component 104 can highlight or emphasize the contact information 220 in the display region of the IMPUI component 104. The user use the IMPUI component 104 to select the various pieces of contact information 220 (e.g., name, company name, address, phone number, email address, etc.), as desired, wherein, for example, the IMPUI component 104 can display a prompt, such as CREATE NEW CONTACT FILE (e.g., when finished selecting desired contact information), in the display region to create a new contact file comprising the selected contact information 220, and the user can select the CREATE NEW CONTACT FILE after the user is finished selecting the desired contact information 220. When the user selects the CREATE NEW CONTACT FILE the IMPUI component 104 and/or IMPC 106 can create a new contact file and store the selected contact information 220 in corresponding fields in the new contact file, wherein the new contact file can be stored in the data store 108 (e.g., in a contact folder, comprising respective contact files, in the data store 108).

In still another aspect, the IMPUI component 104 can employ voice recognition to facilitate intelligent processing of messages using message processing controls, such as those controls disclosed herein. For example, the user can speak the phrase ACTIVATE MESSAGE PROCESSOR to activate the IMPUI component 104 and/or IMPC 106 to perform intelligent message processing; speak the word ARCHIVE to select the ARCHIVE control 202, wherein the IMPC 106 can parse the email message 200 and highlight the keyword "Adams" 204 in response to the ARCHIVE control 202 being selected via voice recognition by the IMPUI component 104; and speak the keyword "Adams" into the IMPUI component 104 to select the file folder associated with the keyword "Adams" 204 (e.g., tag name "Adams).

In yet another aspect, the IMPUI component 104 can allow the user to use hybrid instructions to have the IMPUI component 104 and IMPC 106 intelligently process messages, wherein for instance, the user can input a voice command for one portion of the message processing and a mouse click, keyboard selection, or screen touch, for another portion of the message processing with regard to a particular message, such as email message 200. For example, the user can speak the word ARCHIVE into the IMPUI component 104 to activate the IMPUI component 104 and IMPC 106 to perform an archive function, as disclosed herein, wherein the IMPC 106 can parse the message 200 and highlight the keyword "Adams" 204; and the user can click on the keyword "Adams" to have the IMPUI component 104 and/or IMPC 106 store a copy or move the message 200 in the desired file folder associated with the keyword "Adams" 204.

Figure 3:
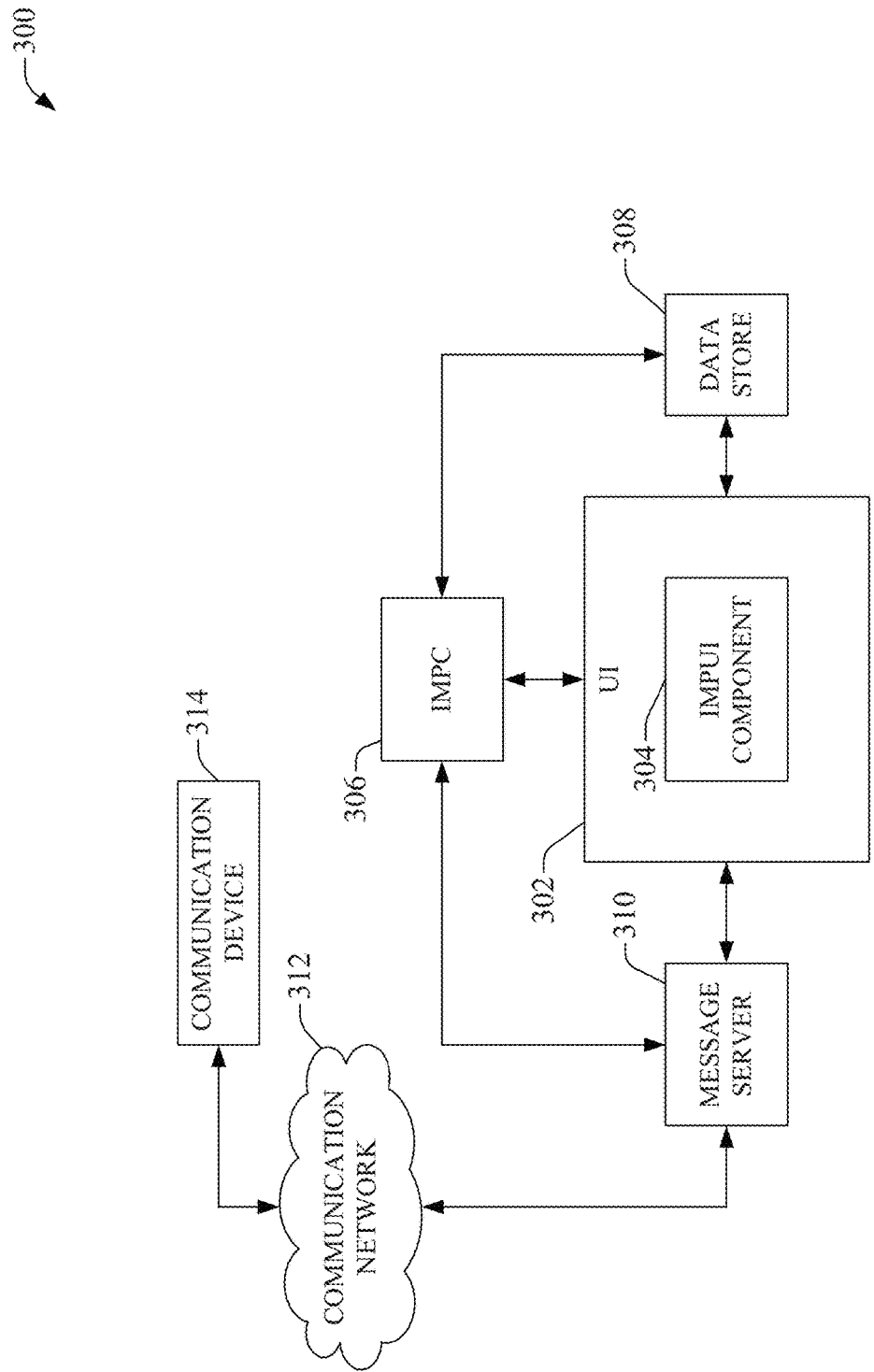
FIG. 3 illustrates a block diagram of an example system that can intelligently process messages in accordance with various aspects and embodiments of the disclosed subject matter.

FIG. 3 depicts a block diagram of an example system 300 that can intelligently process messages in accordance with various aspects and embodiments of the disclosed subject matter. The system 300 can include a UI 302, IMPUI component 304, IMPC 306, and data store 308, wherein each of these components can be the same or similar as, or can comprise the same or similar functionality as respective components (e.g., respectively named components), as disclosed herein. In accordance with various aspects and embodiments, the UI 302, IMPUI component 304, IMPC 306, and/or data store 308 can be contained within a communication device (not shown), or one or more of these components can be separate from, but associated with, the communication device.

In an aspect, the system 300 can comprise one or more message servers, such as message server 310, that can receive messages (e.g., emails, text messages, multimedia messages, etc.) from message senders and provide the messages to a user via the UI 302 and/or IMPUI component 104, associated with the one or more message servers (e.g., 310). The one or more message servers, such as message server 310, also can be associated with the data store 308, wherein received messages can be stored in the data store 308, as desired.

In another aspect, the one or more message servers (e.g., 310) can be associated with (e.g., connected to) a communication network 312 that can facilitate wired and wireless communication between communication devices (e.g., communication device 314 and the communication device associated with the IMPUI component 304 and IMPC 306) associated with the communication network 312. In accordance with various aspects and embodiments, the communication network 312 can comprise a core network (e.g., mobile core network) (not shown)) that can be employed to facilitate communication by communication devices associated (e.g., wirelessly connected) with the core network and other communication devices associated with the communication network 312. The core network can be associated with APs (e.g., macro or cellular AP, femto AP, pico AP) (not shown) to facilitate wireless communication of voice and data associated with communication devices, such as communication device 314, associated with the communication network 312. The core network can facilitate routing voice and data communications between communication devices (e.g., computer, mobile phone (e.g., cellular phone, smart phone), personal digital assistant (PDA), electronic notepad, electronic netbook, electronic gaming device, another type of electronic device with communication capabilities, servers (e.g., email server, multimedia server, audio server, video server, news server, financial or stock information server), etc.) via the core network or via an IP-based network (e.g., Internet, intranet, etc.) (not shown) associated with (e.g., included in or connected to) the communication network 312. The core network also can allocate resources to the communication devices (e.g., 314) in the communication network 312, convert or enforce protocols, establish and enforce Quality of Service (QoS) for the communication devices, provide applications or services in the network, translate signals, and/or perform other desired functions to facilitate system interoperability and communication in the wireless communication network. The core network further can include desired components, such as routers, nodes (e.g., SGSN, GGSN, etc.), switches, interfaces, controllers, etc., that can facilitate communication of data between communication devices associated with the communication network 312. The communication network 312 can include an IP-based network (not shown) that can be associated with the core network and can facilitate communications by communication devices associated with the communication network 312 at least in part via communication of data packets (e.g., IP-based data packets) between communication devices (e.g., 314) that are associated with the communication network 312 using a wired or wireless communication connection in accordance with specified IP protocols.

Figure 4:
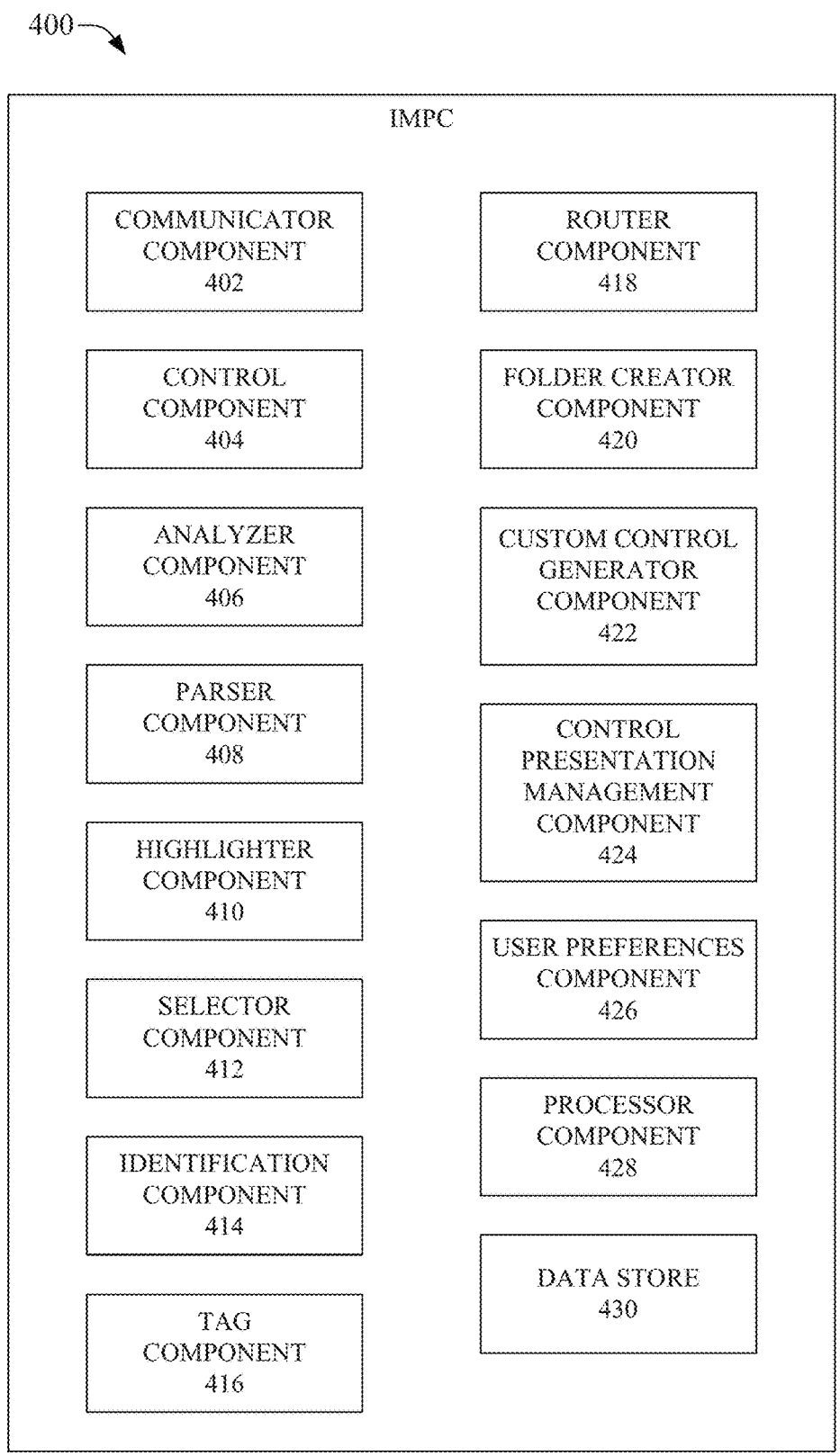
FIG. 4 depicts a block diagram of an example intelligent message processing component (IMPC) that can facilitate intelligent message processing in accordance with various aspects and embodiments of the disclosed subject matter.

Referring to FIG. 4, depicted is a block diagram of an example IMPC 400 that can facilitate intelligent message processing in accordance with various aspects and embodiments of the disclosed subject matter. In accordance with an aspect, the IMPC 400 can comprise a communicator component 402 that can facilitate communication (e.g., transmission, reception) of information between components within the IMPC 400 or communication between the IMPC 400 and other components associated with the IMPC 400.

In another aspect, the IMPC 400 can include a control component 404 that can perform one of more control functions in response to selection of the one or more control functions. For example, the control component 404 can perform a respectively desired control function in response to a respectively selected control, such as an ARCHIVE control, a HAVE ASSISTANT HANDLE control, a PLAY ON TV control, an ACCESS/STORE LINKED PAGE, etc., or a custom control.

In an aspect, the IMPC 400 can comprise an analyzer component 406 that can analyze information, such as information associated with a message being processed by the IMPC 400, to facilitate processing a message or performing a desired action, wherein the information can comprise, for example, the sender of a message, recipient of a message, subject header of a message, information included in the body of a message, metadata associated with a message, information associated with a data store (e.g., file folder names, content stored in file folders, etc.), tag information (e.g., tag name or word), etc.

In still another aspect, the IMPC 400 can contain a parser component 408 that can parse information associated with a message to facilitate identifying one or more keywords or keyphrases in a message, a link to an online site or page, an attachment, a type of attachment, contact information, etc., to facilitate desirably processing a message. For instance, the parser component 408 can operate in conjunction with the analyzer component 406 to facilitate parsing and processing a message. In an aspect, to facilitate identifying a keyword or keyphrase, the parser component 408 and/or analyzer component 406 (e.g., comprising a comparator component (not shown)) can evaluate or compare words or phrases in a message with known tag words or phrases (e.g., stored tag words or phrases) associated with respective file folders to facilitate identifying a word or phrase in a message as a potential keyword or keyphrase associated with a particular file folder, wherein a word or phrase in a message that matches, or at least substantially matches, a known tag word or phrase can be, or at least potentially can be, a keyword or keyphrase associated with a desired file folder.

In yet another aspect, the IMPC 400 can comprise a highlighter component 410 that can be used to highlight or emphasize information, such as a keyword or keyphrase, in a message. For instance, the highlighter component 410 can highlight a word(s) or phrase(s) associated with a message (e.g., differentiate the color of the display region associated with a word or phrase, or differentiate the color of the characters of the word or phrases, in relation to other words or phrases associated with the message, etc.) or otherwise emphasize a word(s) or phrase(s) associated with a message (e.g., emphasize by differentiating size, or emphasize by bolding a word or phrase, in relation to other words or phrases associated with a message, etc.) to facilitate indicating a keyword(s) or keyphrase(s) to the user via a display region of the IMPUI component, wherein the highlighting or emphasizing can be performed, for example, as more fully disclosed herein.

In accordance with an aspect, the IMPC 400 can include a selector component 412 that can select a control, a parameter setting, a function, an option, etc., in response to received input information (e.g., from a user) via a UI component (e.g., IMPUI component). In another aspect, the IMPC 400 can contain an identification component 414 that can identify one or more keywords or keyphrases in a message, or can identify one or more file folders, applications, or destinations that are associated with a keyword(s), keyphrase(s), or tag word or phrase. For instance, the identification component 414 can operate in conjunction with the analyzer component 406 and/or parser component 408 to facilitate identifying one or more keywords or keyphrases in a message based at least in part on known file folder names or file folder content, known tag words or tag phrases associated with a desired file folder(s), or known or inferred words or phrases that can or may be associated with a desired file folder(s). As another example, the identification component 414 also can facilitate identifying one or more file folders in which storage of a message or associated information can or may be desired, identifying an application to open or access in response to a selected control or information identified in association with a message, or identifying a desired destination for information associated with a message, for example, based at least in part on parsing of the message, selection of a control(s), information stored in the data store, tag information, etc.

In still another aspect, the IMPC 400 can include a tag component 416 that can enable a user to tag a word or phrase (e.g., via selection or highlighting of a word or phrase), or create a tag word or phrase, in response to received input from the user (e.g., user can manually select a tag word or phrase, or user can accept an automatically identified or generated tag word or phrase presented to the user), wherein the IMPC 400 can associate a desired tag word or phrase with a desired file folder. The tag component 416 can facilitate storing tag-related information in a data store (e.g., data store 428).

In yet another aspect, the IMPC 400 can contain a router component 418 that can route information (e.g., message, contact information, attached file, information associated with a link, etc.) to a desired destination (e.g., desired file folder, remote storage location (e.g., STB associated with a TV), desired contact file, etc.) to facilitate desired message processing (e.g., in response to a selection of one or more controls associated with the IMPUI component).

In an aspect, the IMPC 400 can comprise a folder creator component 420 that can create a file folder when desired, such as, for example, when a message is associated with a new matter that does not already have a file folder. A newly created file folder can be stored in a desired location in a data store, for example. In an aspect, the folder creator component 420 or another component associated therewith (e.g., another component of the IMPC 400) can identify or infer a desired location of the newly created file folder to facilitate eliminating or at least reducing the amount of time and number of actions taken to store the newly created file folder in the desired location in the data store or other desired destination, wherein the message or associated information can be stored within the newly created file folder. For example, if a new file folder is being created for an established client (e.g., "Adams") for a new matter for that client, the folder creator component 420 or other component(s) of the IMPC 420 (e.g., analyzer component 406, parser component 408, identification component 414, etc.) can identify a sub-directory (e.g., "Client: Adams") in the data store comprising one or more file folders associated with that client, and can automatically present the sub-directory to the user via the IMPUI component, and the user can select the identified sub-directory if that is the sub-directory desired by the user, which can allow the user to select the identified sub-directory without having to search for and locate the desired sub-directory, or can allow the user to search for and select another desired sub-directory in which to store the new file folder.

In still another aspect, the IMPC 400 can include a custom control generator component (CCGC) 422 that can facilitate enabling a user to create a desired custom message processing control to facilitate desired message processing of messages. The CCGC 422 can receive desired control settings from a user, wherein the desired control settings can be used to facilitate enabling the custom message processing control to perform the desired functions to desirably process a message. For instance, the control settings can relate to an application(s) to be opened or used when the custom message processing control is selected or activated, control parameter setting values for control parameters relating to the custom message processing control, destination of the message or portion thereof (e.g., destination, such as storage in a file folder, storage in a remote storage location associated with a TV, email address to which the message or message portion is to be forwarded, etc.), etc.

In an aspect, the IMPC 400 can include a control presentation management component (CPMC) 424 that can manage (e.g., dynamically control) presentation or display of one or more controls based at least in part on available display space for presenting controls, user preferences, current or historical information relating to user activity with regard to respective controls, messages, and information (e.g., attached files to a message(s), links associated with a message(s), etc.) associated with messages, etc. In another aspect, the CPMC 424 also can dynamically control the location, size, and/or emphasis of message processing controls on the display screen. For example, if the CPMC 424 determines or infers that a certain subset of message processing controls is more likely to be used to process the message as compared to another subset of message processing controls, the CPMC 424 can dynamically display the certain subset of message processing controls such that the message processing controls in the certain subset are displayed on the display screen in a more convenient region of the display screen (e.g., alternatively or in addition to displaying the ACCESS/STORE LINKED PAGE control in a region of the display screen dedicated to displaying message processing controls, the ACCESS/STORE LINKED PAGE control can be displayed near the link and/or can appear on the display when the cursor hovers over the link or when the user selects (e.g., clicks on) the link), the message processing controls in the certain subset can be displayed with a larger size than other message processing controls, and/or the message processing controls in the certain subset can be displayed with more emphasis (e.g., highlighted with a different color) than other message processing controls.

In another aspect, the IMPC 400 can comprise a user preferences component 426 that can enable a user to provide and set desired user preferences (e.g., via one or more menus of available user preferences relating to message processing) or default user preferences to facilitate enabling the user to select (e.g., using the communication device associated with the IMPC 400) desired user preferences in relation to the message processing. The user preferences component 426 can facilitate storing the respective set of user preferences of a respective user in a respective user file of the user, wherein the user file can be stored, for example, in the data store 430. The user preferences can relate, for example, to the number or type of message processing controls to display with a message, the sizes of respective display regions of a display screen, and/or the type of highlighting or emphasis to be used for keywords, keyphrases, links, etc.

The IMPC 400 also can comprise a processor component 428 that can operate in conjunction with the other components (e.g., communicator component 402, control component 404, parser component 406, highlighter component 408, etc.) to facilitate performing the various functions of the IMPC 400. The processor component 428 can employ one or more processors, microprocessors, or controllers that can process data, such as information relating to messages (e.g., information relating to processing of messages, such as disclosed herein), information relating to other operations of the IMPC 400, and/or other information, etc., to facilitate operation of the IMPC 400, as more fully disclosed herein, and control data flow between the IMPC 400 and other components (e.g., IMPUI component, data store 430, communication devices, etc.) associated with the IMPC 400.

The IMPC 400 also can include a data store 430 that can store data structures (e.g., user data, metadata), code structure(s) (e.g., modules, objects, hashes, classes, procedures) or instructions, information relating to messages (e.g., information relating to processing of messages, such as disclosed herein), information relating to other operations of the IMPC 400, etc., to facilitate controlling operations associated with the IMPC 400. In an aspect, the processor component 428 can be functionally coupled (e.g., through a memory bus) to the data store 430 in order to store and retrieve information desired to operate and/or confer functionality, at least in part, to the components of the IMPC 400 (e.g., communicator component 402, control component 404, parser component 406, highlighter component 408, etc.), and/or substantially any other operational aspects of the IMPC 400.

Figure 5:
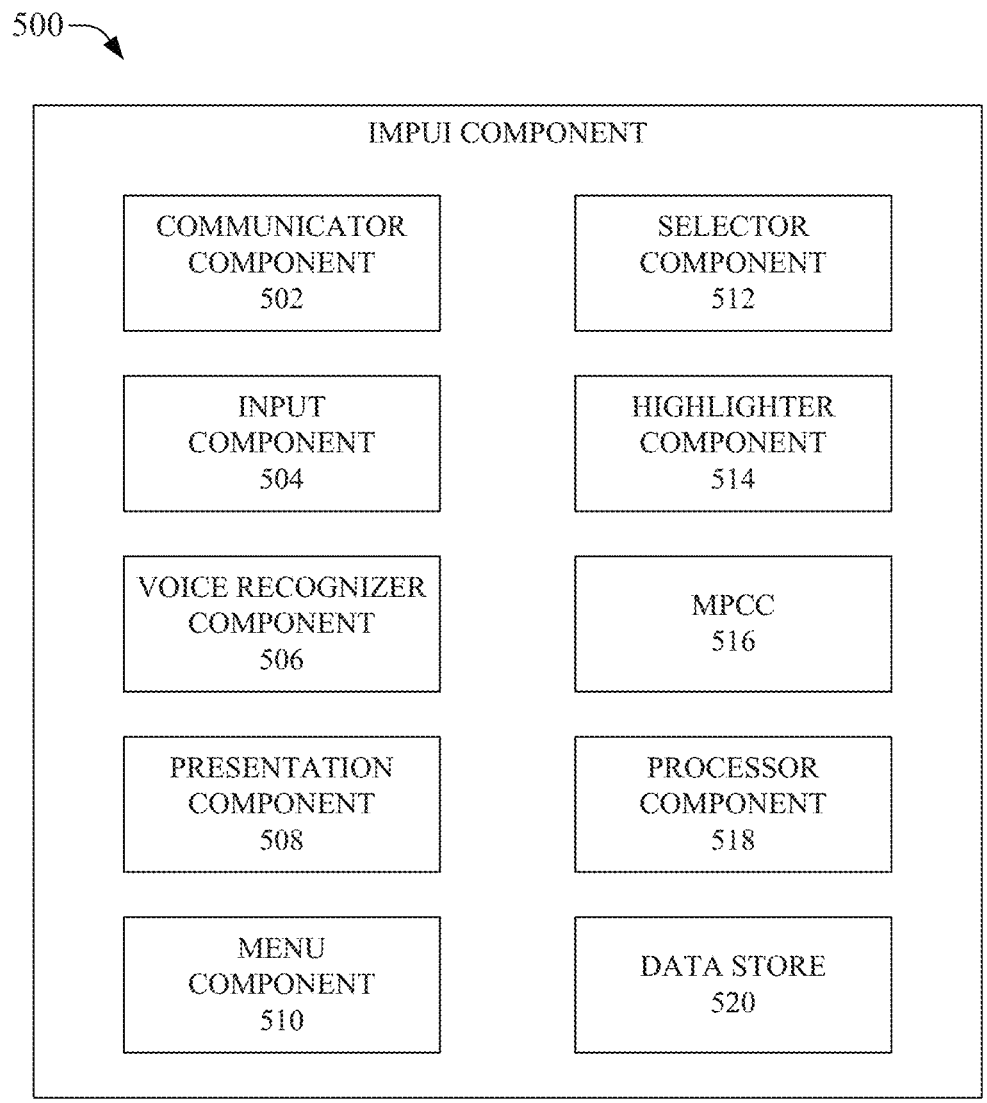
FIG. 5 illustrates a block diagram of an example intelligent message processing user interface (IMPUI) component that can facilitate intelligent message processing in accordance with various aspects and embodiments of the disclosed subject matter.

FIG. 5 depicts a block diagram of an example IMPUI component 500 that can facilitate intelligent message processing in accordance with various aspects and embodiments of the disclosed subject matter. In an aspect, the IMPUI component 500 can comprise a communicator component 502 that can be employed to facilitate communications (e.g., transmission or receptions of information) between the IMPUI component 500 and other components (e.g., IMPC, message server, data store, etc.) associated with the IMPUI component 500.

In another aspect, the IMPUI component 500 can include an input component 504 that can comprise one or more UIs (e.g., keyboard, mouse, trackpad, touch screen, microphone, etc.) that can receive input from a user to facilitate performing desired actions, such as processing of messages. For instance, the user can enter desired information using the one or more UIs to facilitate selecting message processing controls, keywords, file folders, or commands, etc. In still another aspect, the IMPUI component 500 can contain a voice recognizer component 506 that can operate in conjunction with the input component 504 to receive voice input, such as voice commands, and the voice recognizer component 506 can convert the received voice input into corresponding commands, such as message processing commands relating to corresponding message processing controls (e.g., ARCHIVE control), selection of keywords or file folders, and/or other desired actions relating to processing information (e.g., processing messages).

In an aspect, the IMPUI component 500 also can include a presentation component 508 that can provide one or more output interfaces (e.g., display screens, display regions on a display screen, speakers, etc.) that can present (e.g., display) information to the user. For instance, the presentation component 508 can display one or more messages to the user, one or more message processing controls, one or more menus, a keyboard (e.g., on a touch screen display), etc.

In yet another aspect, the IMPUI component 500 can include a menu component 510 that can generate and/or display one or more menus that respectively contain one or more selectable options available to the user to facilitate processing messages, selecting user preferences, creating custom message processing controls, and/or other aspects or functions relating to message processing. In still another aspect, the IMPUI component 500 can comprise a selector component 512 that can facilitate selection of a desired option, preference, button, control, or function, etc., in response to received input from the user (e.g., input received via the input component 504).

In an aspect, the IMPUI component 500 can contain a highlighter component 514 that can be used to facilitate highlighting or emphasizing information (e.g., used to display highlighted or emphasized information; used to highlight or emphasize a piece of information in response to received input indicating that highlighting or emphasis of the piece of information is desired (e.g., by the user, by the IMPC)), such as a keyword or keyphrase, in a message. For instance, the highlighter component 514 can highlight a word(s) or phrase(s) associated with a message (e.g., differentiate the color of the display region associated with a word or phrase, or differentiate the color of the characters of the word or phrases, in relation to other words or phrases associated with the message, etc.) or otherwise emphasize a word(s) or phrase(s) associated with a message (e.g., emphasize by differentiating size, or emphasize by bolding a word or phrase, in relation to other words or phrases associated with a message, etc.) to facilitate indicating a keyword(s) or keyphrase(s) to the user via a display region of the IMPUI component 500, wherein the highlighting or emphasizing can be performed, for example, as more fully disclosed herein.

In an aspect, the IMPUI component 500 can comprise a message processing control component (MPCC) 516 that can be employed to facilitate display of one or more message processing controls via a display screen of the presentation component 508, wherein the message processing controls can be selected by a user, as desired, to facilitate intelligently processing messages. In accordance with various aspects, the message processing controls, or a portion thereof, can be displayed in a dedicated region of a display screen, in one or more menus, and/or displayed in an area of the display screen proximate to a message item with which a particular message processing control can or may be desired (e.g., alternatively or in addition to displaying the ARCHIVE control in a region of the display screen dedicated to displaying message processing controls, the ARCHIVE control can be displayed near a highlighted keyword and/or can appear on the display when the cursor (e.g., cursor, arrow icon, hand icon, etc.) hovers over the keyword or when the user selects (e.g., clicks on) the keyword).

The IMPUI component 500 also can comprise a processor component 518 that can work in conjunction with the other components (e.g., communicator component 502, input component 504, voice recognizer component 506, presentation component 508, etc.) to facilitate performing the various functions of the IMPUI component 500. The processor component 518 can employ one or more processors, microprocessors, or controllers that can process data, such as information relating to message processing, managing communications between various components associated with the IMPUI component 500, information relating to other operations of the IMPUI component 500, and/or other information, etc., to facilitate operation of the IMPUI component 500, as more fully disclosed herein, and control data flow between the IMPUI component 500 and other components (e.g., IMPC, servers, data store, etc.) associated with the IMPUI component 500.

The IMPUI component 500 also can include a data store 520 that can store data structures (e.g., user data, metadata), code structure(s) (e.g., modules, objects, hashes, classes, procedures) or instructions, information relating to processing of messages, managing communications between various components associated with the IMPUI component 500, information relating to other operations of the IMPUI component 500, etc., to facilitate controlling operations associated with the IMPUI component 500. In an aspect, the processor component 518 can be functionally coupled (e.g., through a memory bus) to the data store 520 in order to store and retrieve information desired to operate and/or confer functionality, at least in part, to the components of the IMPUI component 500 (e.g., communicator component 502, input component 504, voice recognizer component 506, presentation component 508, etc.), and/or substantially any other operational aspects of the IMPUI component 500.

Figure 6:
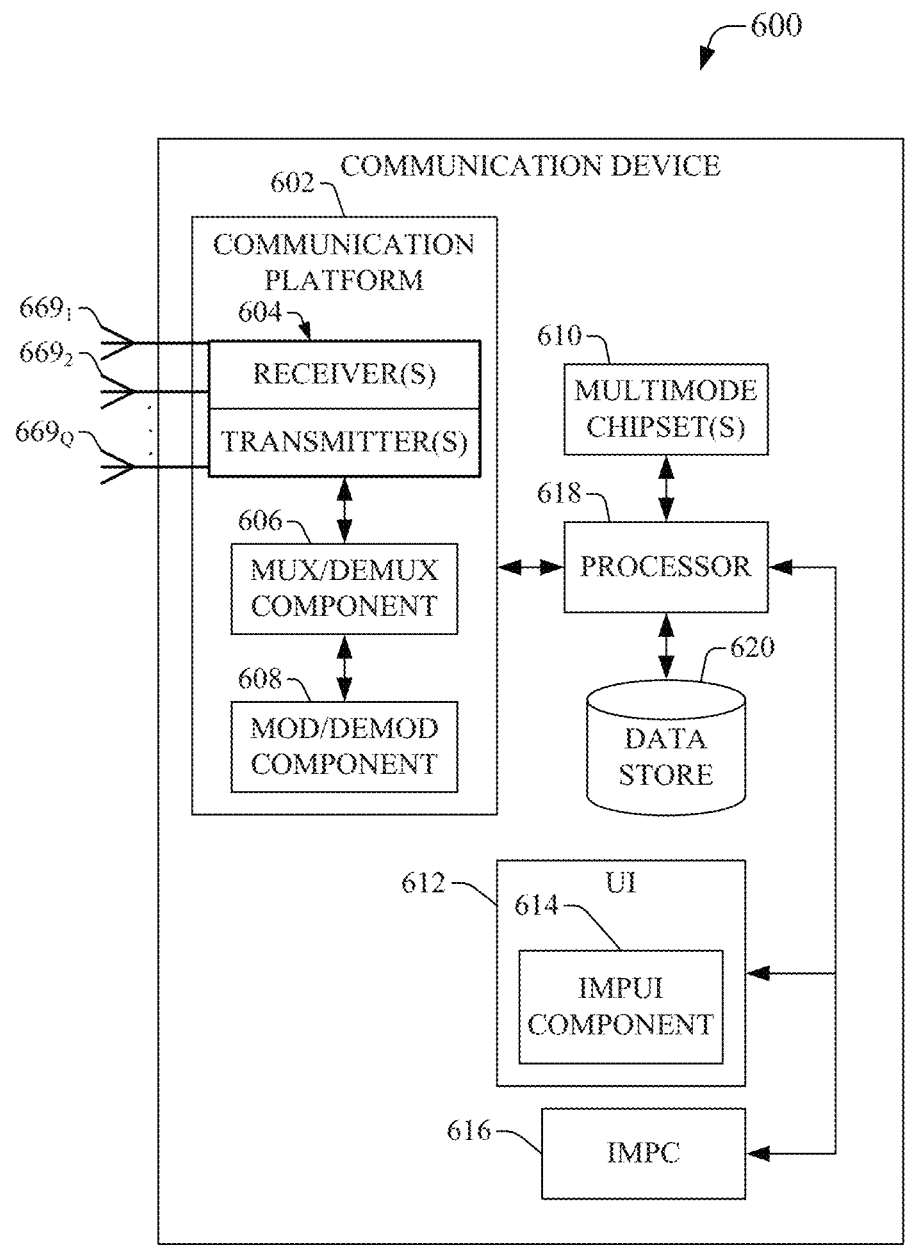
FIG. 6 illustrates a block diagram of an example communication device in accordance with various aspects of the disclosed subject matter.

FIG. 6 depicts a block diagram of an example communication device 600 (e.g., computer, mobile communication device, etc.) that can be employed to facilitate intelligent message processing in accordance with various aspects and embodiments of the disclosed subject matter. In an aspect, the communication device 600 (e.g., computer, laptop computer, mobile phone, smart phone, landline phone with messaging capabilities, electronic notebook or notepad, electronic reading device, electronic gaming device, STB, etc.) can include a communication platform 602 that can comprise electronic components and associated circuitry that can provide for processing and manipulation of a received signal(s) or signal(s) to be transmitted, for example, via a wireline or wireless communication connection. In accordance with various embodiments, the communication device 600 can be employed to facilitate wireless communication with other communication devices, wherein the communication device 600 can be a multimode access terminal, wherein a set of antennas $669_1$-$669_Q$ (Q is a positive integer) can receive and transmit signal(s) from and to wireless devices like access points, access terminals, wireless ports and routers, and so forth, that operate in a radio access network. It should be appreciated that antennas $669_1$-$669_Q$ are a part of the communication platform 602, which can comprise electronic components and associated circuitry that provide for processing and manipulation of received signal(s) and signal(s) to be transmitted, such as, for example, receivers and transmitters 604, multiplexer/demultiplexer (mux/demux) component 606, and modulation/demodulation (mod/demod) component 608. It is to be appreciated and understood that, while communication device 600 is depicted as being capable of communicating via a wireline or wireless communication connection, as desired, in accordance with various embodiments, the communication device 600 also can be configured to be capable or communicating via one of a wireline communication connection (e.g., a computer, such as a personal computer, connected via a wireline communication connection (e.g., digital subscriber line (DSL) connection)) or a wireless communication connection (e.g., a cellular or smart phone connected via a cellular or Wi-Fi communication connection).

In another aspect, the communication device 600 can include a multimode operation chipset(s) 610 that can allow the communication device 600 to operate in multiple communication modes in accordance with disparate technical specification for wireless technologies. In an aspect, multimode operation chipset(s) 610 can utilize communication platform 602 in accordance with a specific mode of operation (e.g., voice, GPS, etc.). In another aspect, multimode operation chipset(s) 610 can be scheduled to operate concurrently (e.g., when Q>1) in various modes or within a multitask paradigm.

In still another aspect, the communication device 600 can contain a UI component 612 that can include a IMPUI component 614, which can comprise one or more interfaces (e.g., display screens, touch screens, buttons, controls, switches, adapters, connectors, speakers, etc.) that can be utilized to perform and/or can facilitate intelligent message processing, as more fully disclosed herein. In yet another aspect, the communication device 600 can comprise an IMPC 616 that can be associated with the UI component 612 (and IMPUI component 614), wherein the IMPC 616 can perform and/or can facilitate intelligent message processing, as more fully disclosed herein.

In an aspect, the communication device 600 also can include a processor(s) 618 that can be configured to confer functionality, at least in part, to substantially any electronic component within the communication device 600, in accordance with aspects of the disclosed subject matter. For example, the processor(s) 618 can facilitate enabling the communication device 600 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. As another example, the processor(s) 618 can facilitate enabling the communication device 600 to process data relating to messaging (e.g., intelligent processing of messages), voice calls, or other applications or services.

The communication device 600 also can contain a data store 620 that can store data structures (e.g., user data, metadata); code structure(s) (e.g., modules, objects, classes, procedures) or instructions; message hashes; neighbor cell list; one or more lists (e.g., whitelist, etc.); information relating to configuring the communication device 600 (e.g., IMPUI component 614, IMPC 616) to intelligently process messages, as more fully disclosed herein; voice calls, messaging, or other applications or services associated with the communication device 600; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; and so on. In an aspect, the processor(s) 618 can be functionally coupled (e.g., through a memory bus) to the data store 620 in order to store and retrieve information (e.g., neighbor cell list; information relating to messaging (e.g., intelligent message processing), voice calls, or other applications or services; frequency offsets; desired algorithms; security code; communication device identifier; etc.) desired to operate and/or confer functionality, at least in part, to communication platform 602, multimode operation chipset(s) 610, UI component 612, IMPUI component 614, IMPC 616, and/or substantially any other operational aspects of the communication device 600.

In accordance with an embodiment of the disclosed subject matter, a design platform (not shown), for example, comprising an application programming interface(s) (API) (not shown), can be employed to enable application developers to develop additional customized message processing controls. For instance, an API can be utilized to create one or more desired custom message processing controls that can be employed to facilitate message processing (e.g., intelligent message processing of messages), wherein custom message processing controls created using an API can be made available to communication device users via a desired format, such as a saved or downloadable file, CD-ROM, DVD-ROM, memory stick (e.g., flash memory stick), floppy disk, etc.

In accordance with another embodiment of the disclosed subject matter, one or more components (e.g., communication device, IMPC, IMPUI component, etc.) in the communication network environment can utilize artificial intelligence (AI) techniques or methods to infer (e.g., reason and draw a conclusion based at least in part on a set of metrics, arguments, or known outcomes in controlled scenarios) an automated response to perform in response to an inference(s); a keyword(s) or keyphrase(s) in a message that can or may be associated with a desired file folder; a file folder(s) that can or may be desired for storage of a message; an application to be utilized or opened in relation to a file attached to a message; a desired destination (e.g., remote storage location) for a message or associated information (e.g., attached video file); a subset of message processing controls to display to a user in a UI (e.g., display screen of the IMPUI component); etc. Artificial intelligence techniques typically can apply advanced mathematical algorithms—e.g., decision trees, neural networks, regression analysis, principal component analysis (PCA) for feature and pattern extraction, cluster analysis, genetic algorithm, and reinforced learning—to historic and/or current data associated with the systems and methods disclosed herein to facilitate rendering an inference(s) related to the systems and methods disclosed herein.

In particular, the one or more components in the communication network environment can employ one of numerous methods for learning from data and then drawing inferences from the models so constructed, e.g., Hidden Markov Models (HMMs) and related prototypical dependency models. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methods, fuzzy logic methods can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited in accordance with implementing various automated aspects described herein. The foregoing techniques or methods can be applied to analysis of the historic and/or current data associated with systems and methods disclosed herein to facilitate making inferences or determinations related to systems and methods disclosed herein.

In accordance with various aspects and embodiments, the subject specification can be utilized in wireless, wired, and converged (e.g., wireless and wired) communication networks. For example, the disclosed subject matter can be employed in wireless networks, with such networks including, for example, 2G type networks, 3G type networks, 4G type networks, LTE, Universal Mobile Telecommunications Systems (UMTS), Code Division Multiple Access (CDMA) type systems, Wideband CDMA (WCDMA) type systems, etc.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be better appreciated with reference to flowcharts in FIGS. 7-14. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 7:
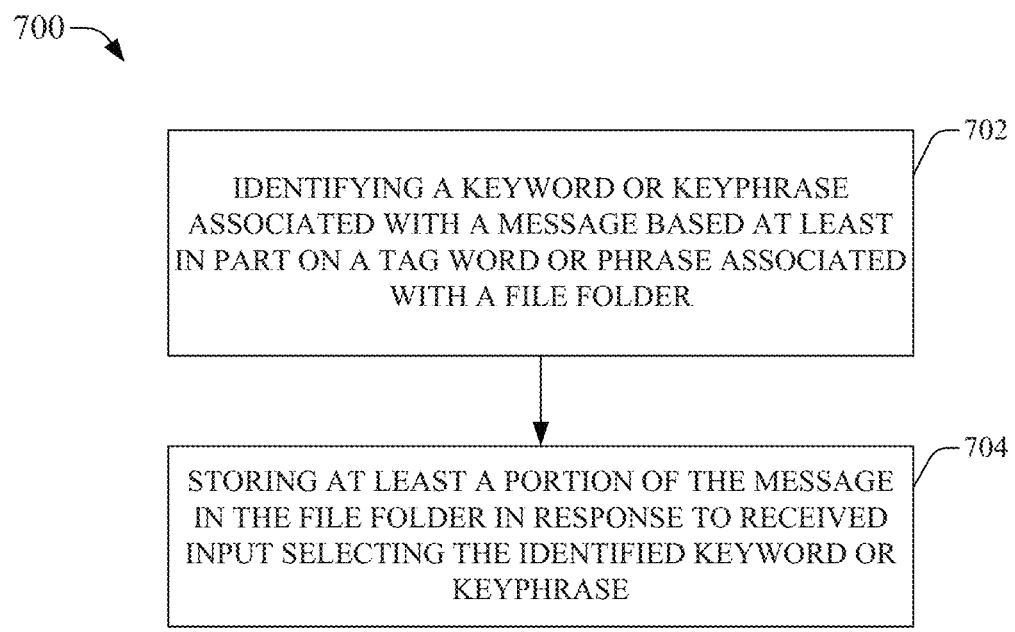
FIG. 7 illustrates a flowchart of an example method that can intelligently process a message in accordance with various aspects and embodiments of the disclosed subject matter.

FIG. 7 presents a flowchart of an example method 700 that can intelligently process a message in accordance with various aspects and embodiments of the disclosed subject matter. At 702, a keyword or keyphrase associated with a message can be identified (e.g., automatically identified) based at least in part on a tag word or phrase associated with a file folder in a data store. In an aspect, an IMPC can analyze and parse a message to identify one or more keywords or keyphrases in or associated with the message (e.g., in the message, or in a file attached to the message), wherein the IMPC can compare words or phrases in or associated with the message with tag words or phrases associated with respective file folders stored in a data store. When a word or phrase associated with the message matches, or at least substantially matches, a tag word or phrase associated with a particular file folder or subset of file folders in the data store, the IMPC can identify the word or phrase as a keyword or keyphrase, can associate the word or phrase with the file folder associated with the tag word or phrase, and can communicate such identification to the IMPUI component. In response to receiving such communication, the IMPUI component can highlight or emphasize the keyword or keyphrase in the displayed message.

At 704, at least a portion of the message can be stored in the file folder in response to received input selecting the identified keyword or keyphrase. The IMPC or IMPUI component can store at least a portion of the message (e.g., the message, an attachment associated with the message) in the file folder associated with the identified keyword or keyphrase, for example, when the IMPUI component receives input from the user selecting the identified keyword or keyphrase in or associated with the message.

Figure 8:
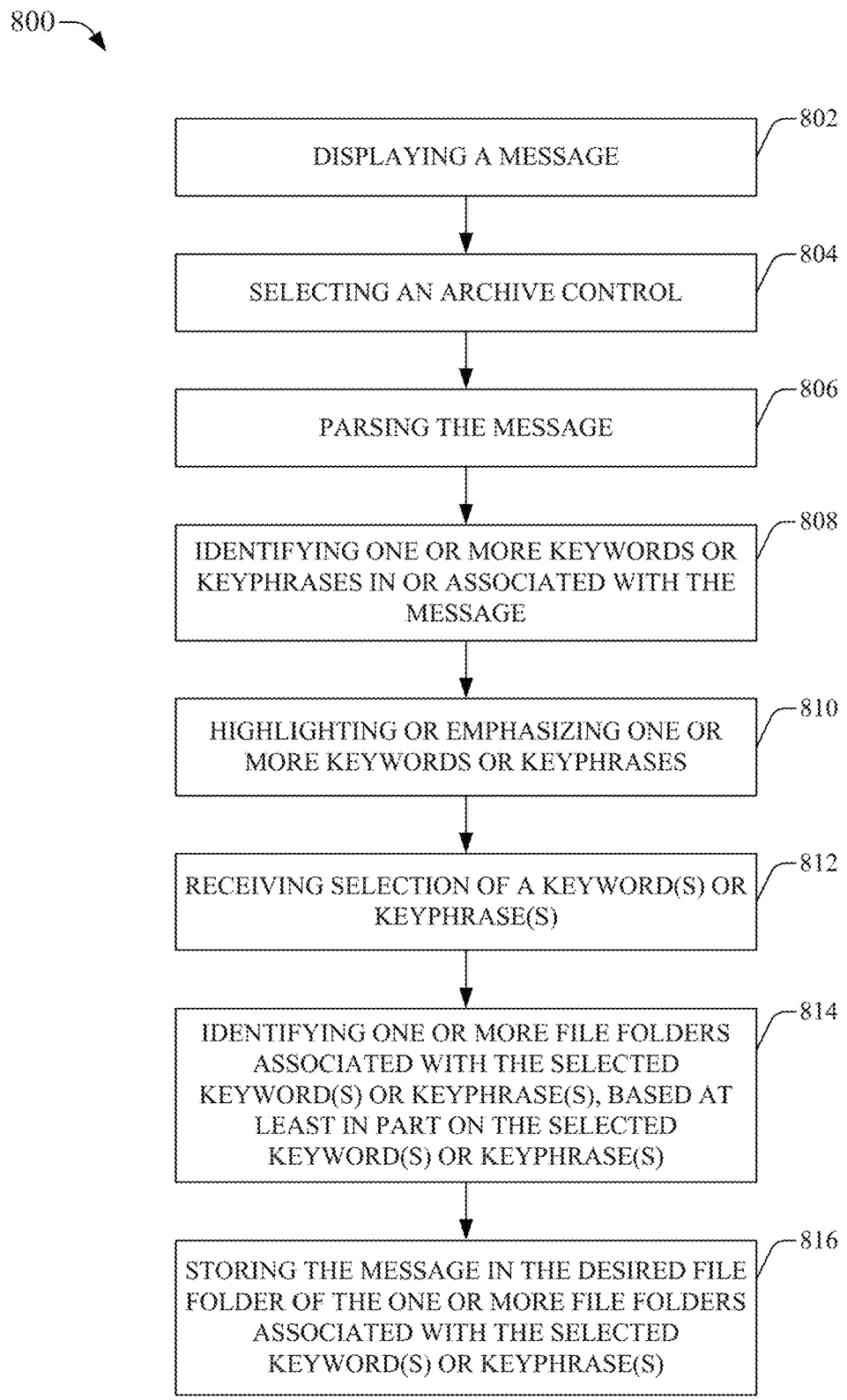
FIG. 8 depicts a flowchart of an example method that can intelligently process messages in accordance with various aspects and embodiments of the disclosed subject matter.

FIG. 8 presents a diagram of a flowchart of an example method 800 that can intelligently process messages in accordance with various aspects and embodiments of the disclosed subject matter. At 802, a message can be displayed, for example, in a desired interface (e.g., display screen of the IMPUI component). The message can be a message received by a communication device or a message that is to be or has been sent from the communication device. At 804, an ARCHIVE control can be selected. In an aspect, input can be received via an interface(s) of the IMPUI component to facilitate selecting the ARCHIVE control and the IMPUI component can be activated to perform intelligent message processing in accordance with the selected ARCHIVE control.

At 806, the message can be parsed. In an aspect, the message can be parsed to identify a potential keyword(s) or keyphrase(s), an attachment(s), a link to an online page or site, etc. For instance, the IMPC can scan, analyze, and/or parse the message to detect or identify items of interest, such as keywords, attachments, links, etc., wherein the type or level of parsing performed can be based at least in part on the message processing control being applied to the message (e.g., employing a message processing control that desires identification of an attached file, but does not require identification of a keyword, can result in the message being parsed to identify any attached files, but not parsed to identify keywords; employing a message processing control that desires identification of a keyword that is or may be associated with a file folder in the data store, but does not require identification of attachments, can result in the message being parsed to identify any instances of a keyword(s), but not parsed to identify attachments).

At 808, one or more keywords or keyphrases in or associated with the message can be identified. In an aspect, the IMPC can parse the information in or otherwise associated with the message to identify a keyword(s) or keyphrase(s) that is or may be associated with a file folder stored in the data store (e.g., a word or phrase that is tagged to associate it with a particular file folder). For instance, the IMPC can compare words, phrases, or other information in or associated with the message to known tag words respectively associated with a file folder or group of file folders stored in the data store (e.g., a subset of file folders associated with the same client or same subject matter) to determine or identify whether any words, phrases, or other information match any of the known tag words, wherein a word(s) or phrase(s) that matches a tag word(s) can or may be identified as a keyword(s) or keyphrase(s) in accordance with the predefined parsing criteria, and wherein the words, phrases, or other information can comprise of, for example, alphanumeric characters.

At 810, one or more keywords or keyphrases can be highlighted or emphasized. In an aspect, the one or more identified keywords or keyphrases can be highlighted or emphasized, as compared to other words, phrases or other information, in the message, so that the keyword(s) or keyphrase(s) can be readily distinguished from the other words, phrases or information in the message. At 812, selection of a keyword(s) or keyphrase(s) can be received. For example, the user can use desired interface controls, buttons, etc., of the IMPUI component to select a desired keyword(s) or keyphrase(s) in the message.

At 814, one or more file folders associated with the selected keyword(s) or keyphrase(s) can be identified, based at least in part on the selected keyword(s) or keyphrase(s). In an aspect, the IMPC can identify one or more file folders associated with the selected keyword(s) or keyphrase(s). The one or more file folders can be presented (e.g., displayed), via the display screen of the IMPUI component, to the user. As desired, if there is only one file folder that is associated with the selected keyword or keyphrase, it is not necessary to present the file folder via the display screen to the user, and the message and/or associated information can be stored in the file folder, for example, as described with regard to act 816.

At 816, the message can be stored in the desired file folder of the one or more file folders associated with the selected keyword(s) or keyphrase(s). In an aspect, if only one file folder is associated with the selected keyword or keyphrase (e.g., if only one file folder is associated with a tag word that matches or is associated with the selected keyword or keyphrase), the IMPC can store the message and/or associated information (e.g., attachment, link, etc.) in that file folder in the data store, without the user having to search and locate that file folder in the directory. If there is more than one file folder that is associated with the selected keyword or keyphrase, the file folders can be presented via the display screen to the user, and the user can enter input via the IMPUI component to select the desired file folder from the presented file folders. In response to the selection of a desired file folder, the IMPC can store the message and/or associated information in the desired (e.g., selected) file folder.

Figure 9:
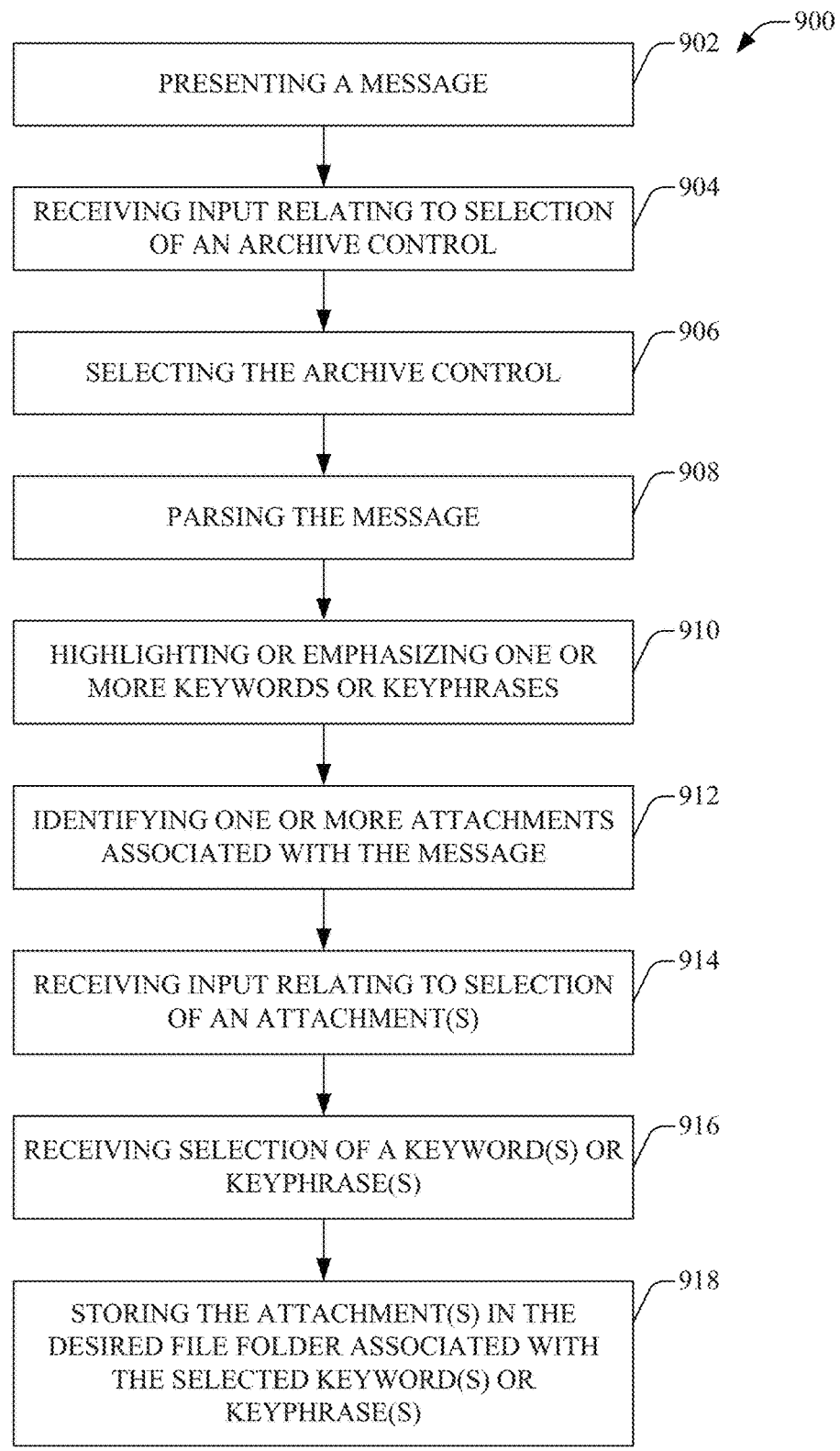
FIG. 9 illustrates a flowchart of an example method that can intelligently process a message to store an attached file(s) in the message using a desired message processing control(s) in accordance with various aspects and embodiments of the disclosed subject matter.

FIG. 9 depicts a diagram of a flowchart of an example method 900 that can intelligently process a message to store an attached file(s) in the message using a desired message processing control(s) in accordance with various aspects and embodiments of the disclosed subject matter. At 902, a message can be presented (e.g., displayed), for example, in a desired interface (e.g., display screen of the IMPUI component). The message can be a received message or a message that is to be or has been sent from the communication device. At 904, input relating to selection of an ARCHIVE control can be received. The ARCHIVE control can be employed to facilitate storing a file(s) attached to the message in a desired file folder, without having to store the entire message.

At 906, an ARCHIVE control can be selected in response to the received input. In an aspect, input can be received via an interface(s) of the IMPUI component to facilitate selecting the ARCHIVE control and the IMPUI component can be activated to perform intelligent message processing in accordance with the selected ARCHIVE control. At 908, the message can be parsed. In an aspect, when the ARCHIVE control activates the IMPUI component, the IMPC can parse the message to identify a potential keyword(s) or keyphrase(s), an attachment(s) (e.g., attached file(s), or other potentially desired information, etc., as more fully disclosed herein. At 910, one or more keywords or keyphrases can be highlighted or emphasized. For example, the IMPUI component can present the message to the user with one or more keywords or keyphrases highlighted or emphasized, as more fully disclosed herein.

At 912, one or more attachments associated with the message can be identified. In an aspect, one or more attachments (e.g., file(s) attached to the message) can be detected and identified in the message. As desired, the identified attachment(s) can be highlighted or emphasized, wherein the highlighting or emphasis of an attachment can be the same or different than that employed for keywords or keyphrases. Alternatively, the one or more attachments do not have to be highlighted or emphasized, but can be selected by the user to facilitate desired processing of the one or more attachments.

At 914, input relating to selection of an identified attachment(s) can be received. In an aspect, the IMPUI component can receive input from the user via an interface(s) to facilitate selection of one or more identified attachments associated with the message. At 916, input relating to selection of a keyword(s) or keyphrase(s) in the message can be received. For example, the user can use the IMPUI component to provide input to select a keyword(s) or keyphrase(s) in the message that is or may be associated with a desired file folder, wherein such input can be received by the IMPUI component or associated IMPC.

At 918, the selected attachment(s) can be stored in the desired file folder associated with the selected keyword(s) or keyphrase(s). For example, if the message processing control (e.g., ARCHIVE control) is being utilized as an attachment archive function, one or more file folders, which are associated with the selected keyword or keyphrase, in the data store can be identified, in response to the selection of the keyword or keyphrase, wherein the one or more file folders can be associated with (e.g., mapped to) a tag word or phrase that matches or is related to (e.g., is mapped to) the selected keyword or keyphrase, and the selected attachment(s) can be stored in the desired file folder (e.g., stored in the file folder associated with the keyword or keyphrase; stored in a user-selected file folder of the subset of file folders associated with the keyword or keyphrase).

Figure 10:
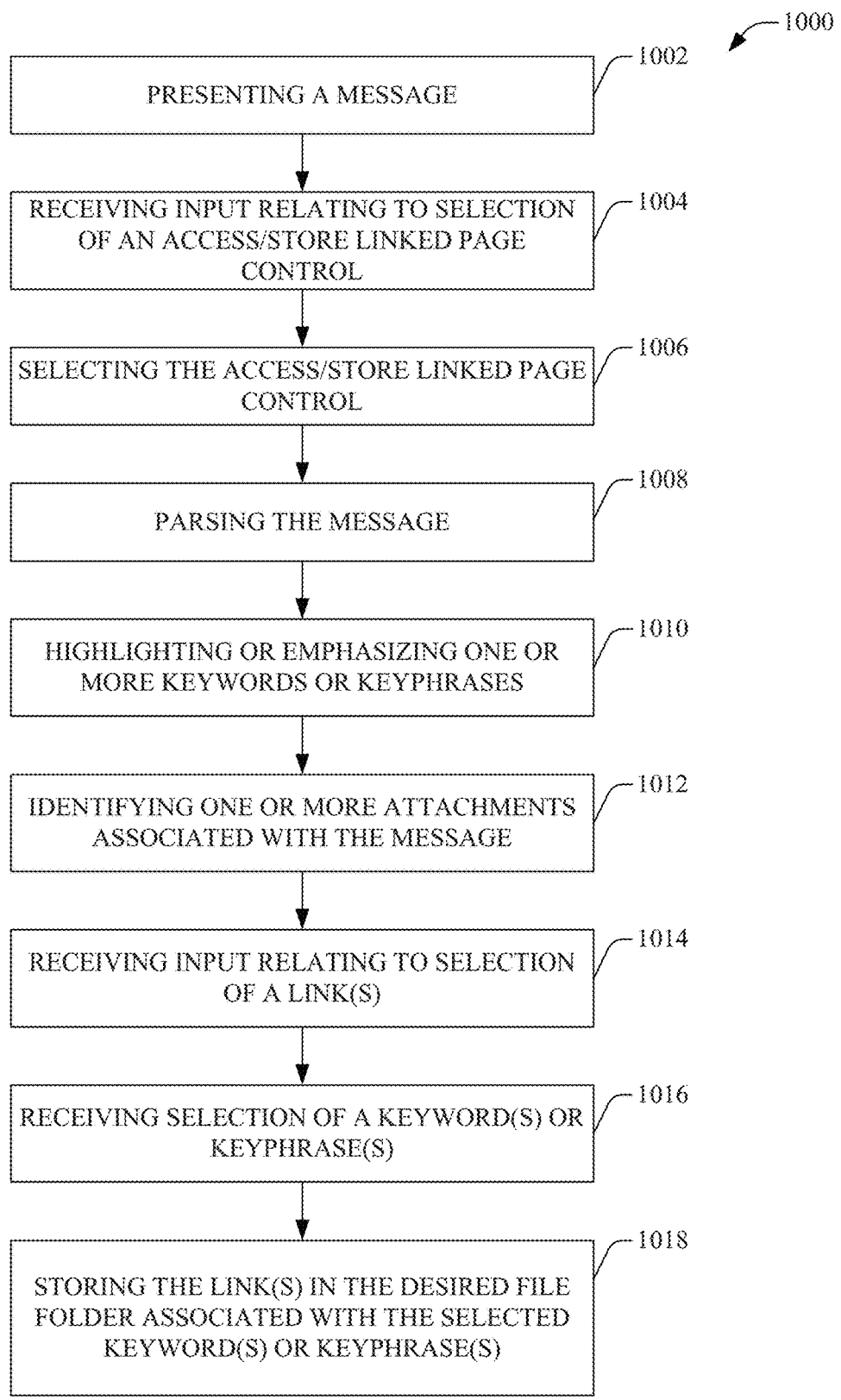
FIG. 10 depicts a flowchart of an example method that can intelligently process a message to access and store an online page or site associated with a link in the message using a desired message processing control(s) in accordance with various aspects and embodiments of the disclosed subject matter.

FIG. 10 illustrates a diagram of a flowchart of an example method 1000 that can intelligently process a message to access and store an online page or site associated with a link in the message using a desired message processing control(s) in accordance with various aspects and embodiments of the disclosed subject matter. At 1002, a message can be presented (e.g., displayed), for example, in a desired interface (e.g., display screen of the IMPUI component). The message can be a received message or a message that is to be or has been sent from the communication device. At 1004, input relating to selection of an ACCESS/STORE LINKED PAGE control can be received. The ACCESS/STORE LINKED PAGE control can be employed to facilitate accessing and storing an online page or site (e.g., web page, web site), which is associated with a link in the message (e.g., which is linked from the link in the message), in a desired file folder, without having to store the entire message.

At 1006, the ACCESS/STORE LINKED PAGE control can be selected in response to the received input. In an aspect, input can be received via an interface(s) of the IMPUI component to facilitate selecting the ACCESS/STORE LINKED PAGE control and the IMPUI component can be activated to perform intelligent message processing in accordance with the selected ACCESS/STORE LINKED PAGE control. At 1008, the message can be parsed. In an aspect, the message can be parsed to identify a potential keyword(s) or keyphrase(s), and a link(s) to an online page(s) or site(s), etc., as more fully disclosed herein.

At 1010, one or more keywords or keyphrases can be highlighted or emphasized. For instance, the IMPUI component can present the message to the user with one or more keywords or keyphrases highlighted or emphasized, as more fully disclosed herein. At 1012, one or more links can be identified in or associated with the message. In an aspect, one or more links (e.g., link to an online page or site) can be detected and identified in or associated with the message. As desired, the identified message item(s) (e.g., link(s)) can be highlighted or emphasized, wherein the highlighting or emphasis of a message item(s) can be the same or different than that employed for keywords or keyphrases. Alternatively, the one or more links do not have to be highlighted or emphasized, but can be selected by the user to facilitate desired processing of the one or more links.

At 1014, input relating to selection of an identified link(s) can be received. In an aspect, the IMPUI component can receive input from the user via an interface(s) to facilitate selection of one or more identified links associated with the message. At 1016, input relating to selection of an identified keyword(s) or keyphrase(s) can be received. For example, the user can use the IMPUI component to provide input to select a keyword(s) or keyphrase(s) in the message that is or may be associated with a desired file folder, wherein such input can be received by the IMPUI component or associated IMPC.

At 1018, the selected link(s) can be stored in the desired file folder associated with the selected keyword(s) or keyphrase(s). For example, if the message processing control (e.g., ACCESS/STORE LINKED PAGE control) is being utilized as a linked page archive function, one or more file folders, which are associated with the selected keyword or keyphrase, in the data store can be identified, in response to the selection of the keyword or keyphrase, wherein the one or more file folders can be associated with (e.g., mapped to) a tag word or phrase that matches or is related to (e.g., is mapped to) the selected keyword or keyphrase, and the selected online page(s) or site(s), and/or the corresponding link(s), can be stored in the desired file folder (e.g., stored in the file folder associated with the keyword or keyphrase; stored in a user-selected file folder of the subset of file folders associated with the keyword or keyphrase).

Figure 11:
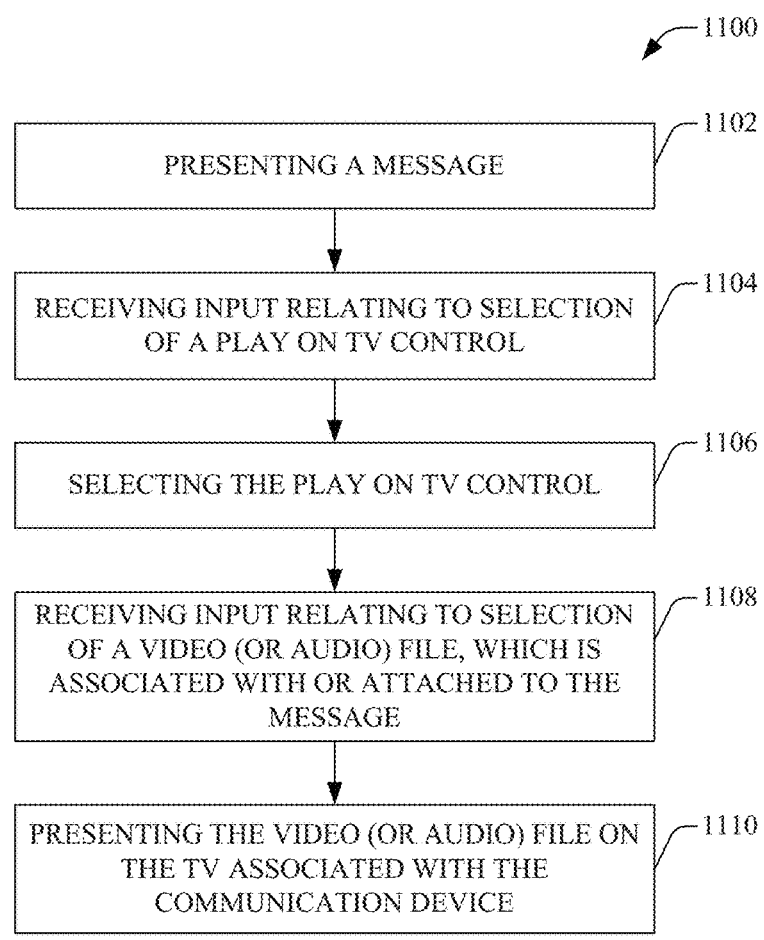
FIG. 11 illustrates a flowchart of an example method that can intelligently process a message to play a video (or an audio) file associated with the message on an associated television (TV) in accordance with various aspects and embodiments of the disclosed subject matter.

FIG. 11 illustrates a diagram of a flowchart of an example method 1100 that can intelligently process a message to play a video (or an audio) file associated with the message on an associated TV in accordance with various aspects and embodiments of the disclosed subject matter. At 1102, a message can be presented (e.g., displayed), for example, in a desired interface (e.g., display screen of the IMPUI component). The message can be a received message or a message that is to be or has been sent from the communication device. At 1104, input relating to selection of a PLAY ON TV control can be received. The PLAY ON TV control can be a message processing control displayed on a display screen, or selectable from a menu, of the IMPUI component. The PLAY ON TV control can be employed to facilitate playing a video (or audio) file associated with (e.g., attached to) the message on a TV associated with the communication device and/or storing the video (or audio) file in a remote storage location (e.g., DVR, STB) associated with the TV.

At 1106, the PLAY ON TV control can be selected in response to the received input. In an aspect, input can be received via an interface(s) of the IMPUI component to facilitate selecting the PLAY ON TV control, and the IMPUI component can be activated to perform intelligent message processing in accordance with the selected PLAY ON TV control. At 1108, input relating to selection of a video (or audio) file, which is associated with or attached to the message, can be received. In an aspect, the IMPUI component can receive input from the user via an interface(s) to facilitate selection of the video (or audio) file. At 1110, the video (or audio) file can be presented (e.g., played) on the TV associated with the communication device (e.g., communication device comprising the IMPUI component). In accordance with various aspects, the video (or audio) file can be transferred (e.g., transmitted) to a remote storage location (e.g., DVR, STB) associated with the TV and the TV can access the file stored in the remote storage location to play it on the TV, or the communication device can play the video (or audio) file and have it presented on the TV.

Figure 12:
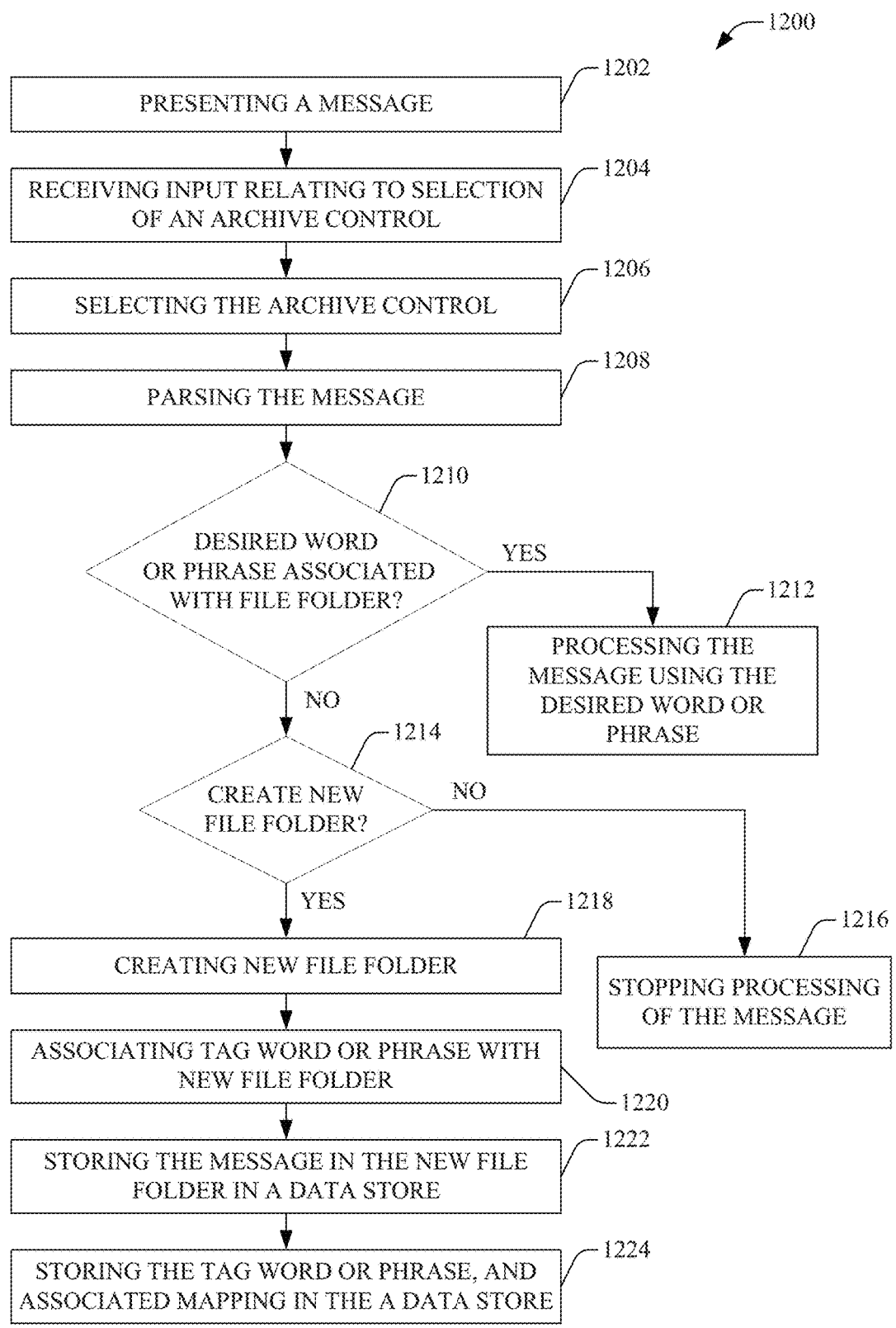
FIG. 12 depicts a flowchart of an example method that can desirably store a message or associated information in a desired file folder in accordance with various aspects and embodiments of the disclosed subject matter.

FIG. 12 illustrates a diagram of a flowchart of an example method 1200 that can desirably store a message or associated information in a desired file folder in accordance with various aspects and embodiments of the disclosed subject matter. At 1202, a message can be presented (e.g., displayed), for example, in a desired interface (e.g., display screen of the IMPUI component). The message can be a received message or a message that is to be or has been sent from the communication device. At 1204, input relating to selection of an ARCHIVE control can be received. The ARCHIVE control can be employed to facilitate storing a file(s) attached to the message in a desired file folder, without having to store the entire message.

At 1206, an ARCHIVE control can be selected in response to the received input. In an aspect, input can be received via an interface(s) of the IMPUI component to facilitate selecting the ARCHIVE control and the IMPUI component can be activated to perform intelligent message processing in accordance with the selected ARCHIVE control. At 1208, the message can be parsed. In an aspect, when the ARCHIVE control activates the IMPUI component, the IMPC can parse the message to identify, or at least attempt to identify, a potential keyword(s) or keyphrase(s), an attachment(s) (e.g., attached file(s), or other potentially desired information, etc., as more fully disclosed herein.

At 1210, a determination can be made regarding whether there is a desired word or phrase in or associated with the message that is or may be associated with a desired file folder stored in the data store. For instance, the parsing of the message can or may result in no keyword or keyphrase being identified in relation to a file folder, or the parsing of the message can result in a keyword or keyphrase being identified in relation to a file folder, but the user does not desire to store the message in the file folder associated with the identified keyword.

If it is determined that there is a desired word or phrase in or associated with the message that is or may be associated with a desired file folder, at 1212, the message can be processed (e.g., intelligently processed) using the desired word or phrase (e.g., identified keyword or keyphrase) in accordance with the ARCHIVE control. For instance, the word or phrase can be identified as a keyword or keyphrase and can be associated with the file folder (e.g., temporarily associated with the file folder during the processing of the message). In an aspect, the keyword or keyphrase can be highlighted or emphasized in the message, as more fully disclosed herein. The user can use the IMPUI component to select the desired keyword or keyphrase and the message can be stored in the desired file folder associated with the selected keyword or keyphrase.

Referring back to act 1210, if, at 1210, it is determined that there is no desired word or phrase in or associated with the message that is or may be associated with a file folder (e.g., no word or phrase identified, identified word or phrase is not desired by the user), at 1214, a determination can be made regarding whether a new file folder is to be created. For example, a prompt can be provided (e.g., displayed) to the user inquiring whether the user desires to create a new folder. If no new file folder is desired, at 1216, processing of the message can be stopped or suspended.

If, at 1214, it is determined that a new file folder is to be created, at 1218, a new file folder can be created. For instance, the user can use the IMPUI component to select a create new file folder option, and, in response, the IMPUI component and/or IMPC can create a new file folder.

At 1220, a tag word or phrase can be associated with the new file folder. In an aspect, the IMPC and/or IMPUI component can recommend a file folder name and/or a tag word or phrase to associate with the new file folder. For instance, the IMPC can parse the message to identify a potential file folder name and/or potential tag word or phrase for the new file folder. The user can select the file folder name and/or potential tag word or phrase by providing corresponding input to make such selections using the IMPUI component. Additionally or alternatively, the user can specify a file folder name and/or a desired tag word or phrase a tag word or phrase that can be associated with the file folder by providing corresponding input to the IMPUI component. A mapping can be created between the new file folder and the tag word or phrase, wherein the mapping can be employed to facilitate identifying and/or locating the new file folder in the data store, for example, when a subsequent message is parsed and a word or phrase in the subsequent message matches the tag word or phrase. The mapping also can include or be associated with other information, such as directory or storage information (e.g., information identifying the storage drive, file folder that is higher up in the file-folder hierarchy than the new file folder (e.g., file folder in which the new file folder is stored), storage location information (e.g., storage address where the new file folder is stored), etc.), to facilitate enabling the IMPC to locate and retrieve the new file folder when desired.

At 1222, the message, or a desired portion thereof (e.g., attached file), can be stored in the new file folder. The new file folder can be stored in a data store. At 1224, the tag word or phrase, and a mapping of the association of the tag word or phrase with the new file folder, can be stored in a data store (e.g., same data store as the new file folder or another desired data store).

Figure 13:
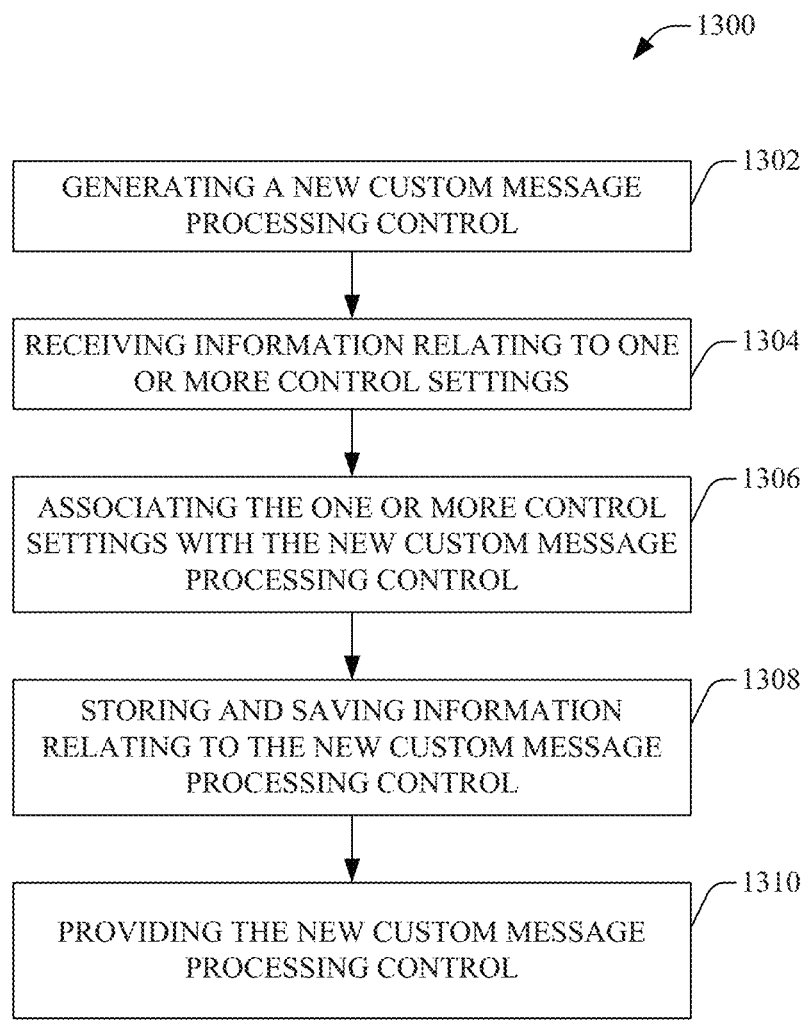
FIG. 13 illustrates a flowchart of an example method that can create a custom message processing control in accordance with various aspects and embodiments of the disclosed subject matter.

FIG. 13 illustrates a diagram of a flowchart of an example method 1300 that can create a custom message processing control in accordance with various aspects and embodiments of the disclosed subject matter. At 1302, a new custom message processing control can be generated. The new custom message processing control can relate to a desired message processing function(s) that is desired by the user to intelligently process a message in a manner desired by the user.

At 1304, information relating to one or more control settings can be received. In an aspect, the user can enter and/or select desired control settings to facilitate enabling the custom message processing control to perform the desired functions to desirably process a message. For instance, the control settings can relate to an application(s) to be opened or used when the custom message processing control is selected or activated, control parameter setting values for control parameters relating to the custom message processing control, destination of the message or portion thereof (e.g., destination, such as storage in a file folder, storage in a remote storage location associated with a TV, email address to which the message or message portion is to be forwarded, etc.), etc.

At 1306, the one or more control settings can be associated with the new custom message processing control. For instance, the one or more control settings can be associated with the new custom message processing control so that when the new custom message control is selected or activated, the new custom message processing control can operate in accordance with the one or more control settings to process the message. At 1308, information relating to the new custom message processing control can be saved and stored. Information (e.g., control name, control settings, code for providing the control or implementing the control, etc.) can be saved and stored in a data store. At 1310, the new custom message processing control can be provided to the user. In an aspect, the new custom message processing control can be displayed on the display screen of the IMPUI component or contained in a menu associated with the IMPUI component.

Figure 14:
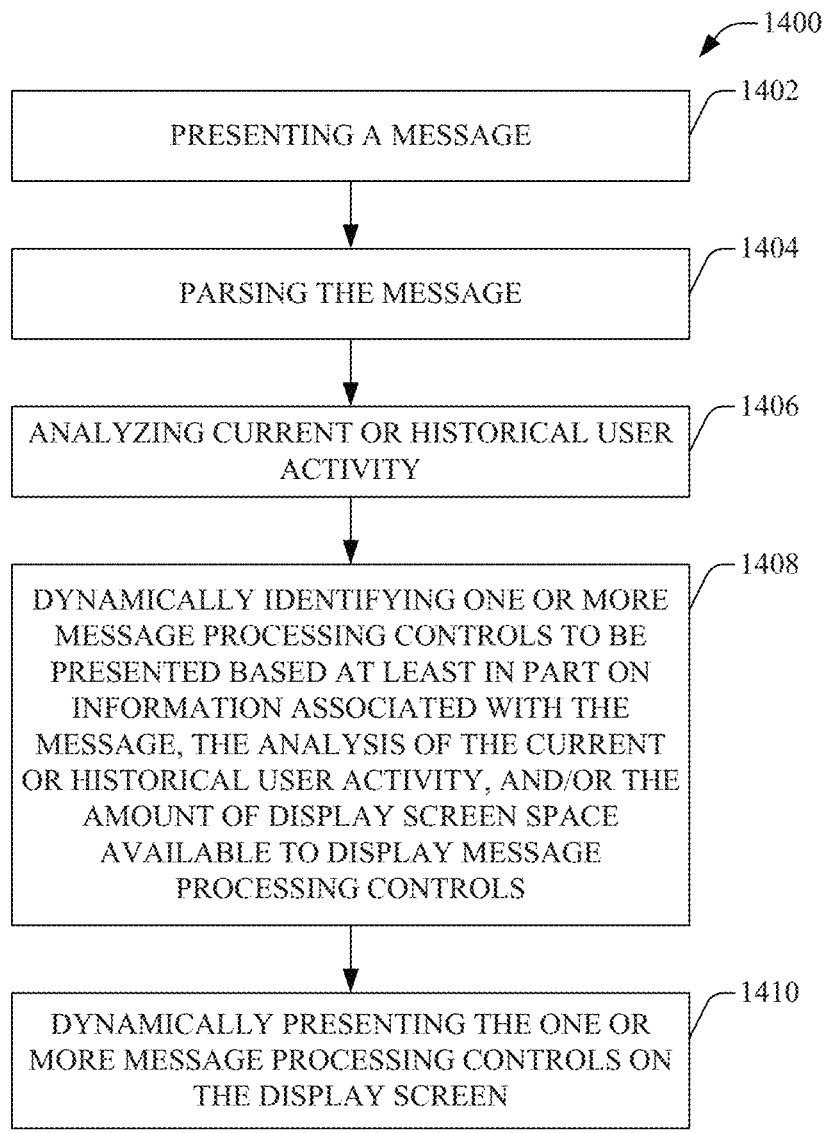
FIG. 14 depicts a flowchart of an example method that can dynamically display a subset of message processing controls in accordance with various aspects and embodiments of the disclosed subject matter.

FIG. 14 illustrates a diagram of a flowchart of an example method 1400 that can dynamically display a subset of message processing controls in accordance with various aspects and embodiments of the disclosed subject matter. A user can or may have a significant number of message processing controls that can be used to intelligently process messages. However, display screen space available for displaying message processing controls can be limited to a certain size. Method 1400 can facilitate dynamically identifying and displaying a certain number of potentially desired message processing controls to fit in the available region of the display screen employed for displaying message processing controls.

At 1402, a message can be presented (e.g., displayed), for example, in a desired interface (e.g., display screen of the IMPUI component). At 1404, the message can be parsed. In an aspect, the message can be parsed to facilitate identifying one or more message processing controls to dynamically display on the display screen of the IMPUI component. The IMPC can parse the message to identify a potential keyword(s) or keyphrase(s), an attachment(s), a link to an online page or site, or other information that can provide an indication of one or more message processing controls that can be desired by the user to desirably process the message.

At 1406, current or historical user activity can be analyzed. In an aspect, the IMPC can analyze and evaluate user activity associated with the user (and/or the communication device), such as, for example, user activity relating to message processing, to facilitate dynamically identifying and displaying one or more message processing controls that can be desired by the user to process the message. For example, the IMPC can analyze user activity relating to how the user interacted or processed other messages received from the same message sender as the current message being processed (or to the same desired message recipient as the current message when the user is the message sender); how the user interacted or processed other messages that contained a same type of attachment as the current message being processed; how the user interacted or processed other messages that contained a link when the current message being processed includes a link; how the user interacted or processed other messages that contain the same potential keyword or keyphrase as the current message; etc.

At 1408, one or more message processing controls, which are to be presented, can be dynamically identified based at least in part on information associated with the message, the analysis of the current or historical user activity, and/or the amount of display screen space available to display message processing controls. For example, if the message includes an attached video file but no link to an online page, and user-activity analysis indicates that the user frequently (e.g., at least a predefined percentage of time) views video files attached to messages, the IMPC can assign a higher score or weight relating to dynamically displaying the PLAY ON TV control than a score or weight for an ACCESS/STORE LINKED PAGE control, particularly since there is no link in the message. The IMPC and/or IMPUI component can dynamically select the PLAY ON TV control for display on the display screen over (e.g., instead of) the ACCESS/STORE LINKED PAGE control based at least in part on their respective assigned scores or weightings relating to dynamic display of message processing controls (provided that there are not a number of other message processing controls that have higher scores or weights than the PLAY ON TV control such that there is insufficient room in the display region dedicated for display of message processing controls to include the PLAY ON TV control in the subset of dynamically displayed message processing controls).

At 1410, the one or more message processing controls can be dynamically presented (e.g., dynamically displayed) on the display screen. A desired subset of message processing controls can be dynamically identified, selected, and/or presented in the display region of the display screen of the IMPUI component that is dedicated for display of message processing controls.

In accordance with various other aspects and embodiments, the user can use the IMPUI component to adjust the amount of display screen space available to display message processing controls to increase the amount of display screen space in order to display more message processing controls or decrease the amount of display screen space in order to display less message processing controls, as desired; and/or adjust the size of the buttons, which can be represented by displayed icons associated with respective message processing controls, to decrease the size of the buttons in order to display more message processing controls on the available display screen space or increase the size of the buttons in order to display less message processing controls on the available display screen space.

Figure 15:
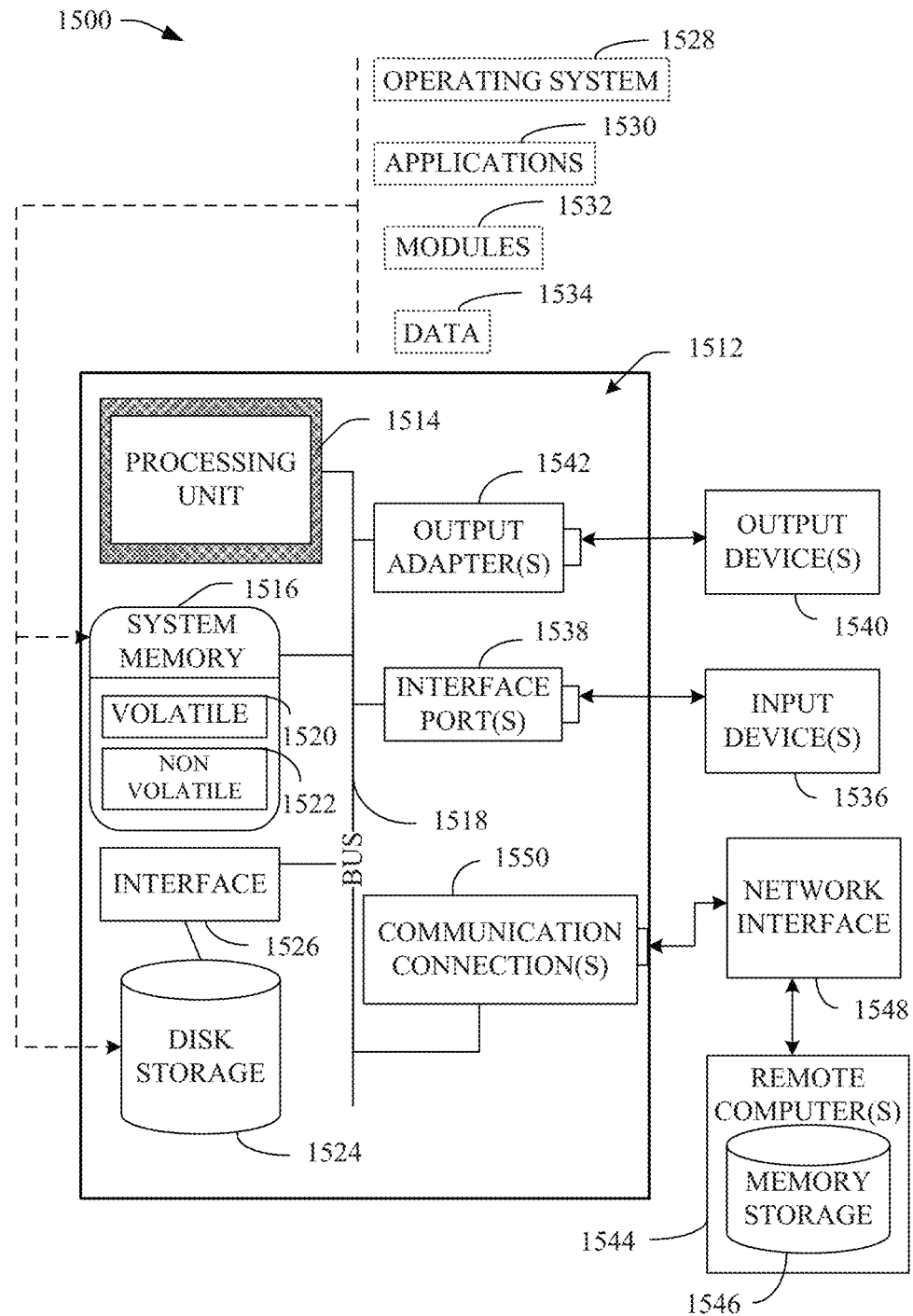
FIG. 15 is a schematic block diagram illustrating a suitable operating environment.
Figure 16:
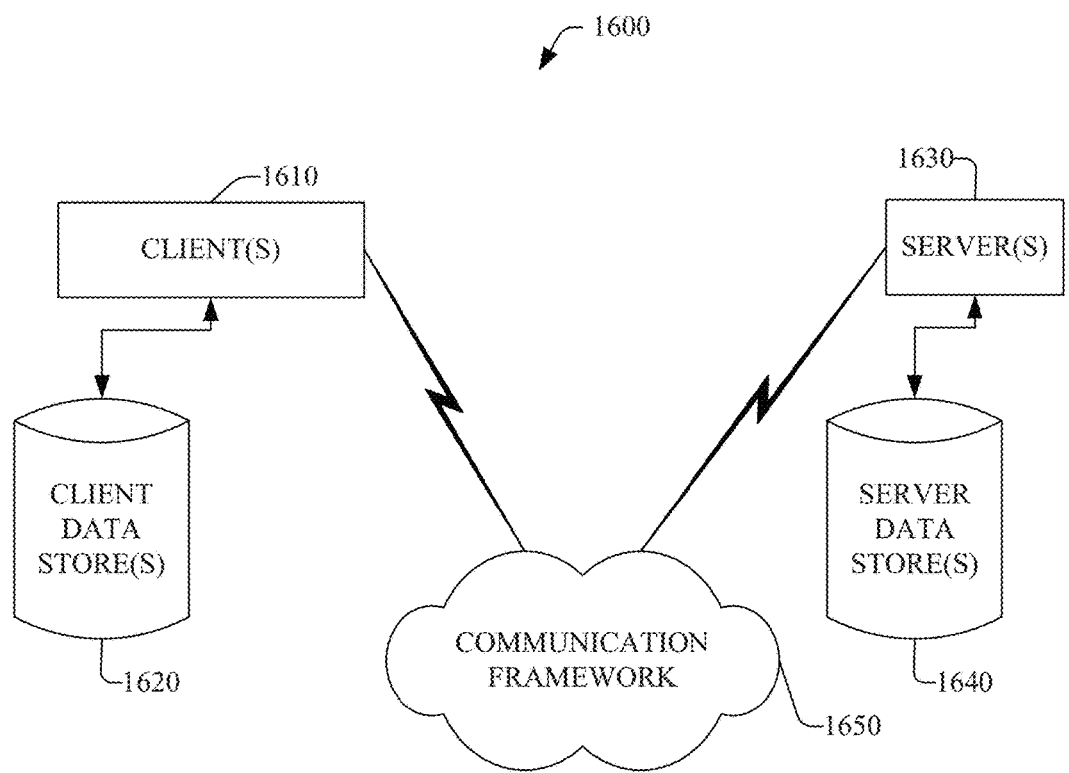
FIG. 16 is a schematic block diagram of a sample-computing environment.

In order to provide a context for the various aspects of the disclosed subject matter, FIGS. 15 and 16 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the disclosed subject matter also may be implemented in combination with other program modules. Generally, program modules include routines, programs, components, data structures, etc. that perform particular tasks and/or implement particular abstract data types. Moreover, those skilled in the art will appreciate that the disclosed methods may be practiced with other computer system configurations, including single-processor or multiprocessor computer systems, mini-computing devices, mainframe computers, as well as personal computers, hand-held computing devices (e.g., personal digital assistant (PDA), phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the disclosed subject matter can be practiced on stand-alone computers. In a distributed computing environment, program modules may be located in both local and remote memory storage devices.

With reference to FIG. 15, a suitable environment 1500 for implementing various aspects of the disclosed subject matter includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable programmable ROM (EEPROM), or flash memory. Volatile memory 1520 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1512 also includes removable/non-removable, volatile/nonvolatile computer storage media. FIG. 15 illustrates, for example, a disk storage 1524. Disk storage 1524 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used, such as interface 1526.

It is to be appreciated that FIG. 15 describes software that acts as an intermediary between users and the basic computer resources described in the suitable operating environment 1500. Such software includes an operating system 1528. Operating system 1528, which can be stored on disk storage 1524, acts to control and allocate resources of the computer system 1512. System applications 1530 take advantage of the management of resources by operating system 1528 through program modules 1532 and program data 1534 stored either in system memory 1516 or on disk storage 1524. It is to be appreciated that the claimed subject matter can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device 1540. Output adapter 1542 is provided to illustrate that there are some output devices 1540 like monitors, speakers, and printers, among other output devices 1540, which require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

FIG. 16 is a schematic block diagram of a sample-computing environment 1600 with which the subject specification can interact. The system 1600 includes one or more client(s) 1610. The client(s) 1610 can be hardware and/or software (e.g., threads, processes, computing devices). The system 1600 also includes one or more server(s) 1630. Thus, system 1600 can correspond to a two-tier client server model or a multi-tier model (e.g., client, middle tier server, data server), amongst other models. The server(s) 1630 can also be hardware and/or software (e.g., threads, processes, computing devices). The servers 1630 can house threads to perform transformations by employing the disclosed subject matter, for example. One possible communication between a client 1610 and a server 1630 may be in the form of a data packet transmitted between two or more computer processes.

The system 1600 includes a communication framework 1650 that can be employed to facilitate communications between the client(s) 1610 and the server(s) 1630. The client(s) 1610 are operatively connected to one or more client data store(s) 1620 that can be employed to store information local to the client(s) 1610. Similarly, the server(s) 1630 are operatively connected to one or more server data store(s) 1640 that can be employed to store information local to the servers 1630.

It is to be appreciated and understood that components (e.g., communication device, communication network, IMPUI component, IMPC, etc.), as described with regard to a particular system or method, can include the same or similar functionality as respective components (e.g., respectively named components or similarly named components) as described with regard to other systems or methods disclosed herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), phase change memory (PCM), flash memory, or nonvolatile RAM (e.g., ferroelectric RAM (FeRAM). Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory (e.g., card, stick, key drive . . . ) or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the disclosed subject matter. It is, of course, not possible to describe every conceivable combination of components or methods for purposes of describing the claimed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
  a processor; and
  a memory that stores executable instructions that, when executed by the processor, facilitate performance of operations, comprising:
  determining that a word in a message received from a sender device is a keyword, based on parsing information associated with the message and a defined parsing criterion, to facilitate processing the message based on the keyword and a first message processing control;
  determining message processing controls that are able to facilitate the processing of the message based on the parsing of the information associated with the message, wherein the information associated with the message comprises a first information portion that is determined to be related to the first message processing control, a second information portion that is determined to be related to a second message processing control, and a third information portion that is determined to be related to a third message processing control;
  determining whether the first message processing control, the second message processing control, and the third message processing control are to be included in a group of message processing controls to be presented on a display screen based on the parsing of the information associated with the message and based on historical information relating to user activities with regard to processing of messages presented on the display screen;
  determining that the first message processing control and the second message processing control are to be included in the group of message processing controls to be presented on the display screen and the third message processing control is not to be included in the group of message processing controls to be presented on the display screen based on the parsing of the information associated with the message and based on a result of an analysis of the historical information relating to the user activities indicating that the first message processing control and the second message processing control are utilized on a more frequent basis than the third message processing control; and
  in response to a single manipulation of a user-interface control to drag a graphical representation of the keyword from the location in the message to move the graphical representation of the keyword over the first message processing control and release the graphical representation of the keyword onto the first message processing control,
    activating the first message processing control to facilitate determining a file folder that is associated with a tag word that is related to the keyword, based on the first message processing control, and
    in response to the determining the file folder based on a result of the activating of the first message processing control, storing the information associated with the message in the file folder, wherein the activating of the first message processing control, the determining of the file folder, and the storing of the information associated with the message in the file folder are performed in response to the single manipulation of the user-interface control, wherein the storing is performed without presenting the file folder on the display screen, and wherein the file folder is determined to be an only file folder accessible to the system that is associated with the keyword.

2. The system of claim 1, wherein the determining whether the first message processing control, the second message processing control, and the third message processing control are to be included in the group of message processing controls to be presented on the display screen comprises determining whether the first message processing control, the second message processing control, and the third message processing control are to be included in the group of message processing controls to be presented on a region of the display screen based on the parsing of the information associated with the message, the historical information relating to the user activities with regard to the processing of messages presented on the display screen, and a size of the region of the display screen.

3. The system of claim 2, wherein the determining that the first message processing control and the second message processing control are to be included in the group of message processing controls to be presented on the display screen and the third message processing control is not to be included in the group of message processing controls to be presented on the display screen comprises:

determining that the first message processing control and the second message processing control are to be included in the group of message processing controls to be presented on the region of the display screen and the third message processing control is not to be included in the group of message processing controls to be presented on the region of the display screen based on the result of the analysis of the historical information relating to the user activities indicating that the first message processing control and the second message processing control are utilized on the more frequent basis than the third message processing control and based on the size of the region of the display screen being determined to not be large enough to accommodate three message processing controls.

4. The system of claim 1, wherein the operations further comprise:
in response to determining that a cursor is hovering over the third information portion, initiating display of the third message processing control on the display screen in proximity to the third information portion to facilitate processing at least the third information portion of the message using the third message processing control.

5. The system of claim 1, wherein the first message processing control is an archive control that facilitates storage of the information associated with the message, and wherein the operations further comprise:
parsing the information associated with the message to facilitate determining the word associated with the message to be the keyword; and
determining the word is the keyword based on the word satisfying the defined parsing criterion that indicates the word is potentially associated with the file folder stored in a data store.

6. The system of claim 1, wherein the single manipulation of the user-interface control is a single mouse click, wherein, as part of the single mouse click, the graphical representation of the keyword is dragged from the location in the message to move the graphical representation of the keyword over the first message processing control and is released onto the first message processing control, and wherein the operations further comprise:
receiving input information indicating the selection of the keyword in the message, wherein the input information is the single mouse click, and wherein the storing the information associated with the message further comprises storing the information associated with the message in the file folder associated with the tag word that matches the keyword in response to the single mouse click.

7. The system of claim 1, wherein the operations further comprise:
receiving input information indicating a first selection of a file attached to the message and a second selection of the keyword in the message; and
storing the file in the file folder associated with the tag word that matches the keyword based on the first message processing control.

8. The system of claim 1, wherein the operations further comprise initiating presenting of a media file associated with the message on a television based on the second message processing control.

9. The system of claim 1, wherein the operations further comprise:
in response to the second message processing control being selected, accessing an online page associated with a link contained in the message, wherein the second message processing control facilitates an access and storage of the online page associated with the link contained in the message; and
storing online page information associated with the online page in the file folder in a data store, based on the keyword associated with the message matching the tag word associated with the file folder, wherein the online page information associated with the online page comprises a copy of the online page.

10. The system of claim 1, wherein the operations further comprise:
in response to the second message processing control being selected, generating a forwarding message comprising a portion of the message and instruction information to provide an instruction for handling of the message by a recipient identity that is to receive the forwarding message, wherein the second message processing control facilitates forwarding the message to a message box associated with the recipient identity.

11. A method, comprising:
determining, by a system comprising a processor, a word in a message received from a sender device is a keyword, based on parsing information associated with the message and a defined parsing criterion, to facilitate processing the message based on the keyword and a first message processing control;
determining, by the system, message processing controls usable to facilitate the processing of the message based on the parsing of the information associated with the message, wherein the information associated with the message comprises a first information portion that is determined to be related to a first function associated with the first message processing control, a second information portion that is determined to be related to a second function associated with a second message processing control, and a third information portion that is determined to be related to a third function associated with a third message processing control;
determining, by the system, whether the first message processing control, the second message processing control, and the third message processing control are to be included in a group of message processing controls to be presented on a user interface based on the parsing of the information associated with the message and based on historical data relating to user activities with regard to processing of messages presented on a display screen;
determining, by the system, that the first message processing control and the second message processing control are to be included in the group of message processing controls presented on the user interface and the third message processing control is not to be included in the group of message processing controls presented on the user interface based on a result of analyzing the historical data relating to the user activities indicating that the first message processing control and the second message processing control have a higher frequency of use than the third message processing control; and
in response to a single interface control manipulation that facilitates moving the keyword from the location in the message over the first message processing control and releasing the keyword onto the first message processing control,
initiating, by the system, activating the first message processing control to facilitate determining a file folder that is associated with a tag word that is related to the keyword and storage of the information associated with the message in the file folder, and storing, by the system, the information associated with the message in the file folder that is associated with the tag word that is associated with the keyword, in response to the activating of the first message processing control, independent of presenting the file folder on the display screen, wherein the file folder is determined to be an only file folder associated with the keyword, and wherein the initiating activating of the first message processing control, the determining of the file folder, and the storing of the information associated with the message in the file folder are performed based on the single interface control manipulation.

12. The method of claim 11, further comprising:

in response to the second processing control being selected:

determining, by the system, contact information associated with a sender identity associated with sending of the message based on the parsing of the information associated with the message, wherein the contact information comprises a name, a physical address, a phone number, and an email address associated with the sender identity; and storing, by the system, the contact information associated with the sender identity in a contact file in a data store.

13. The method of claim 11, further comprising:

in response to determining there is an interaction between a cursor and the third information portion, displaying, by the system, the third message processing control on the display screen adjacent to the third information portion to facilitate processing at least the third information portion of the message using the third message processing control.

14. The method of claim 11, further comprising:

comparing, by the system, the word associated with the message to respective tag words respectively associated with respective file folders stored in a data store, wherein the determining the word is the keyword further comprises determining the word is the keyword in response to the word matching the tag word of the respective tag words, and wherein the tag word is associated with the file folder of the respective file folders; and emphasizing, by the system, the word in the message to facilitate indicating that the word is the keyword that is associated with the file folder.

15. The method of claim 11, further comprising:

receiving, by the system, input information indicating a selection of a media file associated with the message; and facilitating, by the system, the presenting of media information of the media file on a media presentation device in response to the input information, based on the second message processing control that facilitates presenting the media information of the media file.

16. The method of claim 11, further comprising:

receiving, by the system, input information indicating a selection of a link contained in the message, the second message processing control, and the keyword; and based on the second message processing control and the keyword:

accessing, by the system, an online page associated with the link; and storing, by the system, the online page in the file folder in a data store.

17. The method of claim 11, further comprising:

receiving, by the system, input information indicating a selection of an assistant control of the message processing controls, wherein the assistant control facilitates forwarding the message and instructions relating to managing the information associated with the message to a defined message destination location;

generating, by the system, a forwarding message addressed to the defined message destination location based on the assistant control, wherein the forwarding message comprises the information of the message and instruction information comprising the instructions relating to the managing of the information associated with the message by a user identity associated with the defined message destination location; and communicating, by the system, the forwarding message to the defined message destination location.

18. The method of claim 11, further comprising:

in response to no file folder being identified as being related to the message:

creating, by the system, a new file folder in which to store the message;

determining, by the system, a sub-directory in a data store in which the new file folder is to be stored based on the keyword;

initiating, by the system, presenting of the sub-directory on the display screen to facilitate selecting the sub-directory by a user identity without the user identity having to search for and locate the sub-directory in the data store; and storing, by the system, the new file folder with the message stored therein in the sub-directory in response to selection information being received to indicate the sub-directory has been selected.

19. A non-transitory machine-readable storage medium comprising executable instructions that, when executed by a processor, facilitate performance of operations, comprising:

determining alphanumeric symbols in a message received from a sender device is a keyword, based on parsing information associated with the message and a defined parsing criterion, to facilitate processing the message based on the keyword and a first message processing control;

determining message processing controls, comprising the first message processing control and the second processing control, that are usable to facilitate the processing of the message based on the parsing of the information associated with the message, wherein the information associated with the message comprises a first information portion that is determined to be related to the first message processing control and a second information portion that is determined to be related to the second message processing control;

determining whether the first message processing control and the second message processing control are to be part of a group of message processing controls to be presented on a user interface based on the parsing of the information associated with the message and based on historical data relating to user activities with regard to processing of messages presented on a display screen;

determining that the first message processing control is to be part of the group of message processing controls to be presented on the user interface and the second message processing control is not to be part of the group of message processing controls to be presented on the user interface based on the parsing of the information associated with the message and based on a result of an analysis of the historical data relating to the user activities indicating that the first message processing control is utilized more frequently than the second message processing control; and in response to a single user-interface control manipulation that facilitates dragging the keyword from the location in the message in the message to move the keyword over the first message processing control and releasing the keyword onto the first message processing control, selecting the first message processing control to activate the message processing control to facilitate determining a file folder that is associated with a tag word that matches the keyword and storage of the information associated with the message, and storing the information associated with the message in the file folder that is associated with the tag word that matches the keyword, based on the activating of the first message processing control, without presenting the file folder on a display screen, wherein the file folder is determined to be a sole file folder associated with the keyword, and wherein the selecting of the first message processing control, the determining of the file folder, and the storing of the information associated with the message in the file folder are performed in response to the single user-interface control manipulation.

20. The non-transitory machine-readable storage medium of claim 19, wherein the operations further comprise:

emphasizing the alphanumeric symbols in the message using a first emphasis to facilitate indicating that the word is the keyword that is associated with the file folder; and emphasizing second alphanumeric symbols in the message using a second emphasis to facilitate indicating that the second alphanumeric symbols form a potential keyword that is associated with another file folder that potentially is related to the message.

\* \* \* \* \*